US007360163B2

(12) United States Patent
Masuda

(10) Patent No.: US 7,360,163 B2
(45) Date of Patent: Apr. 15, 2008

(54) WORK SPACE FORMATION APPARATUS

(75) Inventor: Yoshihiro Masuda, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 838 days.

(21) Appl. No.: 10/639,652

(22) Filed: Aug. 13, 2003

(65) Prior Publication Data

US 2004/0167881 A1  Aug. 26, 2004

(30) Foreign Application Priority Data

Feb. 24, 2003  (JP)  ............ P2003-045337

(51) Int. Cl.
 *G06F 17/00* (2006.01)
(52) U.S. Cl. ............ 715/748; 715/738; 715/741; 715/743; 713/168; 713/175
(58) Field of Classification Search ........ 715/733–761; 709/201, 202, 203, 204, 205, 217, 220, 227, 709/230, 232, 238, 245, 248–250; 707/3; 713/168, 175, 201; 710/1
See application file for complete search history.

(56) References Cited

U.S. PATENT DOCUMENTS

| | | | | |
|---|---|---|---|---|
| 5,491,743 | A * | 2/1996 | Shiio et al. ........... | 709/204 |
| 6,772,195 | B1 * | 8/2004 | Hatlelid et al. ....... | 709/204 |
| 2001/0044858 | A1 * | 11/2001 | Rekimoto ............. | 710/1 |
| 2002/0023133 | A1 * | 2/2002 | Kato et al. ............ | 709/205 |
| 2003/0076353 | A1 * | 4/2003 | Blackstock et al. ... | 345/751 |

FOREIGN PATENT DOCUMENTS

JP  A 2001-136504  5/2001

OTHER PUBLICATIONS

Tolmie et al., Unremarkable Computing , Xerox Reasearch Center Europe, CHI 2002, Apr. 20-25, 2002.*
"Jini Architectural Overview", Technical White Paper, Sun Microsystems, Jan. 1999, pp. 1-23.
"Specification of the Home Audio/Video Interoperability (HAVi) Architecture", The HAVi Specification, Ver 1.1 pp. 8-24, May 15, 2001.
Buszko et al., "Decentralized Ad-Hoc Groupware API and Framework for Mobile Collaboration", pp. 5-14, Sep. 30, 2001.
Mochizuki et al. "Application Configuration Tool Kit by Makeshift Technique", Computer Software, vol. 17, No. 6, Nov. 2000, pp. 12-25.
"Understanding Universal Plug and Play", White Paper, Microsoft Windows Me, pp. 1-39, Jun. 2000.

* cited by examiner

*Primary Examiner*—Tadesse Hailu
(74) *Attorney, Agent, or Firm*—Oliff & Berridge, PLC

(57) ABSTRACT

When a user or a portable device enters work space, the user or the portable device entering the work space is detected by reading of an ID tag, and a connection interface public server for managing connection interfaces of computational resources which these user and portable device have and a coordination server for performing coupling processing are notified. The coordination server acquires the connection interfaces corresponding to the computational resources of the entering user or the portable device from the public server and couples these and thereby, it is constructed so that linkage between the computational resources shareable in the work space can be performed to make use.

15 Claims, 17 Drawing Sheets

FIG. 5A

```
<?xml version = "1.0" encoding = "shift - JIS"?>
<sensedinfo>
    <messageid> 13C57A9B11D1E3 </messageid>
    <credential> 1C23A4B5D6F7C8 </credential>
    <status> detected </command>
    <objectid> 2A4A6D81CB012 </userid>
    <datetime> 10:23:15 July, 20, 2002 </datetime>
    <tagreaderid> 5B10A1CF5D20 </tagreaderid>
</sensedinfo>
```

```
<?xml version = "1.0" encoding = "shift - JIS"?>
<sensedinfo>
    <messageid> 1A35D791F1A13 </messageid>
    <credential> 12B3C45EA6D7F8 </credential>
    <status> disappeared </command>
    <objectid> 24A68DB1F01E2 </userid>
    <datetime> 10:23:15 July, 20, 2002 </datetime>
    <tagreaderid> 5C1D0BA1E52B0 </tagreaderid>
</sensedinfo>
```

52

WORK SPACE FORMATION APPARATUS

BACKGROUND OF THE INVENTION

The present invention relates to a technique for coupling computational resources such as documents or application components available in work space in the case of working in certain work space, and to a distributed system architecture for supporting an automatic setup as the optimum environment to do cooperative work in the work space using various computational resources in, for example, a situation in which plural workers advance cooperative work by moving various work space inside an office.

Various distributed system architectures designed assuming that various kinds of devices present in real work space or software components offered by the devices are dynamically combined to perform cooperative operation are conventionally as disclosed in "Sun Microsystems, Inc.: JINI Technology Architectural Overview, 1999", "Understanding Universal Plug and Play: A White Paper, June 2000" and "Sony, Matsushita, Philips, Thomson, Hitachi, Toshiba, Sharp, and Grundig: Specification of the Home Audio/Video Interoperability (HAVi) Architecture, May 1998".

However, in these platform frameworks, a platform for dynamical connection of the devices or the software components is offered, but a function of dynamically coupling in response to positions of a device or a user moving on a variety of actual work space is not offered.

On the other hand, a technique for configuring a function dynamically in response to positions of a device or an user is also proposed as disclosed in JP-A-2001-136504. In this method, seamless document interchange between different devices is enabled by being able to detect positions of various devices present on physical space through marker recognition and interchange addresses or IDs given to electronic objects displayed in the respective devices or physical objects of the real world through direct operation.

However, in this method, only address or ID information is interchanged and functional coordination of software etc. cannot be performed.

Also, a method for abstracting devices or software parts unevenly distributed in the real world in a unit called a body component and dynamically integrating the body components on an execution entity calling them a soul component in response to their positions is proposed as disclosed in"Mochizuki, Tokuda, Pozeshonuea: Application Configuration Tool Kit by Makeshift Technique, Computer Software, Vol.17, No.6, 2000".

However, in this method, in a manner similar to a coordination framework of non-patent reference 1 etc., inquiry is made of centralized directory service for offering positions or presence of service and service is retrieved to link, so that it is probably difficult to implement coordination in open environment over a network.

Also, an application framework for ad hoc making connection between applications on plural devices through asynchronous message interchange by buffering and offering decentralized and fault tolerant cooperative work space is proposed as disclosed in "D. Buszko, W. Lee, A. Halal, Decentralized Ad-Hoc Groupware API and Framework for Mobile Collaboration, ACM GROUP' 01, Sep. 30-Oct. 3, 2001".

However, in the method proposed herein, position information about various devices is not used and coordination between the devices is performed by ad hoc connection in mobile environment and an end user must perform the connection operation itself.

In environment in which plural workers (users) conduct business while moving various places such as a living room or a meeting room inside an office, in order that the plural workers gather in the same work space and efficiently do cooperative work such as presentation, discussion and examination of design drawing, environment of cooperative work in which use is limited to a certain user is not prepared and flexibility constructed so that documents owned by the respective workers are mutually offered and shared as necessary or coordination between portable computers brought by the worker or coordination between a device placed in the work space and a device brought by the user can be performed to operate is required.

Further, instead of limiting use to users registered previously or enabling coordination only between devices or contents of kinds predetermined, coordination objects are not limited and openness in which all coordinations are enabled without imposing special limitations is also required in the case of users participating in a situation in which cooperative work is done on real space or devices connected to a network and used in work.

Furthermore, instead of a method in which one server performs centralized control, decentralization of control for operating various devices mutually connected equally with high reliability and high efficiency as a whole is required.

SUMMARY OF THE INVENTION

The invention is performed in view of the conventional circumstances, and an object of the invention is to implement flexibility, openness and further decentralization and form the optimum work space to do cooperative work using various computational resources.

Incidentally, a further object of the invention is apparent from the following description.

A basic configuration of a work space formation apparatus according to the invention for solving the objects described above is a work space formation apparatus capable of coupling and using plural calculation resources in work space by connecting the computational resources available in the work space, including public means for holding and managing connection interfaces of the computational resources, detection means for detecting presence of the computational resources available in the work space, acquisition means for acquiring the connection interfaces of the detected available computational resources from the public means, and coordinating relation derivation means for setting a coordinating relation between the plural computational resources based on the acquired connection interfaces, and it is the apparatus for linking the corresponding computational resources based on the set of coordinating relation.

Incidentally, the invention is achieved as a method implemented by an apparatus according to the invention and further a computer program or an element apparatus for constructing an apparatus according to the invention as well as an apparatus.

In the case of making description more specifically in addition to illustration, a work space formation apparatus according to the invention is constructed so that a position of a user in work space or a device carried by the user is detected and connection interfaces about calculation resources owned by the detected user or computational resources on the device carried by the user and connection interfaces about computational resources offered by a device placed in the work space are associated with an unique address on a network and are published on the network and a coordinating relation capable of setting between the computational resources is derived based on the connection interfaces about calculation resources available on the work space in which the published connection interfaces are acquired through the network and the computational resources can be coupled and used mutually by making connection between the calculation resources based on the coordinating relation capable of setting between the computational resources derived.

As a result of this, in work environment in which plural users do business while moving various places inside an office, work space can automatically be coordinated and formed by detecting positions of the users and mutually connecting computational resources (electronic contents or application components) owned by the users and computational resources offered by various devices installed in places in which the users do work in any environment connected to a network.

Also, it may be constructed so that in publication of connection interfaces, nature of public/private associated with time and a place is set to individual connection interfaces and access is limited with respect to acquisition of the connection interfaces.

As a result of this, computational resources of a coordination target among calculation resources owned by a user can be limited to computational resources shared in work actually and the computational resources can be prevented from being shared more than necessary.

Also, it may be constructed so that in detection of a target position, an unique credential (access permit) is issued to connection interfaces about computational resources owned by a detected user or computational resources on a device carried by the user and processing is performed in acquisition of the connection interfaces on condition of matching of the credential.

As a result of this, the computational resources of a coordination target are identified after a location of the user in the work space is checked, so that coordination of the calculation resources based on security management in a form adapted for a work situation on real work space can be achieved.

Also, it may be constructed so that computational resources owned by an user are associated with the user and are held in memory of any place on a network, and it may be constructed so that connection between computational resources is made by fetching entities of the computational resources corresponding to connection interfaces from holding means of the computational resources.

As a result of this, the computational resources can be managed on computers individually managed by each the user without intensively holding the computational resources owned by the user with a server etc. or making a copy in the case of cooperative work.

Also, it may be constructed so as to form a coordinating relation with another work space present at a remote site in work space formation, and it may be constructed so that in coordinating relation derivation of computational resources, connection interfaces of computational resources of another work space are mutually interchanged and also in response to addition, deletion and change of the connection interfaces, notification of the fact is mutually provided and a coordinating relation is derived every time.

As a result of this, cooperative work space in which plural work spaces present at the remote site are connected on a network can be formed.

Also, it may be constructed so that an unique credential (access permit) for accessing computational resources is issued to a user working on work space and the user can make use by presenting this credential and obtaining access permission in the case of accessing the computational resources.

As a result of this, access to the computational resources in which a certain degree of safety on security is ensured can be obtained without setting access right with respect to individual computational resources one by one in the case of sharing the computational resources among plural users.

Also, it may be constructed so that a change in members constructing work space is detected and start time and end time of cooperative work are detected and after the end time, a coordinating relation derived is made invalid.

As a result of this, timing for deriving the coordinating relation of computational resources can be switched automatically in the case that plural worker groups changes time to use in work space such as a shared meeting room.

Also, it may be constructed so that the derived coordinating relation between computational resources is associated with the detected start time and end time of cooperative work and is held and the relation between computational resources is fetched from the time and is offered by request from a user.

As a result of this, relevant computational resources can be fetched by tracing the coordinating relation between computational resources in situations of the cooperative work done in the past. For example, material offered by another participant shared in the case of the past meeting can be fetched and reused.

Also, it may be constructed so that strength of relevance between contents is calculated with respect to contents which is a computational resource based on the contents included in its contents or attribute information given to the contents and a coordinating relation for cross reference between their contents is derived and also associative contents access capable of associative access between contents by tracing a link between contents based on their relation information can be obtained.

As a result of this, document interchange with another user can be advanced to increase sharing of background information using cooperative work on real space as a trigger.

Also, it may be constructed so that connection interfaces for connecting linkage targets are defined as "contents type" indicating a kind of contents and "operation name set" indicating a set of operations capable of applying a function offerable by an application component to contents of the contents type and collation between their connection interfaces is performed and thereby a linkage between the contents and the application component is performed.

As a result of this, connection between electronic contents operating cooperatively and plural application components for operating the contents can be made openly flexibly to form cooperative work space dynamically.

From the above description, in work environment in which plural users do business while moving various places inside an office, work space for doing group work can dynamically be coordinated by mutually connecting computational resources (electronic contents or application components) owned on a personal computer of each the user and computational resources offered by various devices installed in places in which the users do work using "situation (context)" of "working in the same work space" as a trigger by detecting positions of the users or devices carried by the users.

In a position of a user on real work space or a computer carried by the user, for example, an ID embedded in an ID card or the computer is detected by a sensor (such as RFID) installed in each place and is recognized as a target linked to the work space. Incidentally, an unique name on a network is given to the ID.

Here, the real work space means places capable of cutting off according to work purposes such as "my seat", "meeting room" and "front of bulletin board".

For example, each real work space is equipped with a coordination mechanism corresponding to the work space, and a connection interface of a computing resource recognized as to be present in the place by a sensing mechanism is retrieved through a network and is registered in the coordination mechanism. Incidentally, when the sensing mechanism recognizes that the computational resource is not present in the work space, the computational resource is deleted from the coordination mechanism.

In the coordination mechanism, for example, linkage of two types of automatic setting of a hyperlink between documents owned by plural users and coupling of plural application components associated with operation to shared contents can be performed.

According to the former type, electronic documents owned by the respective users can mutually be accessed among the users gathering in the same room. Also, a relation between the documents linked herein is held as a link and information sharing can be advanced. Also, according to the latter type, for example, various kinds of application components such as control, display and annotation of presentation can dynamically be associated with a slide to perform shared operation.

Also, when plural work spaces present at a remote site mutually are connected, coordination mechanisms of the respective work spaces share connection interfaces between their work spaces. As a result of this, the work spaces can mutually make peer to peer type connection. Here, when a new computational resource is added and deleted on one work space or a state of a computational resource changes, an event indicating that it has changed is sent to another work space. When the connection between the work spaces is released, the connection interface of a coordination target is released. Incidentally, start time and end time about a context of cooperative work are automatically detected by a change in members constructing cooperative work.

BRIEF DESCRIPTION OF THE DRAWINGS

These and other objects and advantages of this invention will become more fully apparent from the following detailed description taken with the accompanying drawings in which:

FIGS. 5A and 5B are diagrams describing an object detection message according to one embodiment of the invention;

DETAILED DESCRIPTION OF THE PREFERRED EMBODIMENTS

The invention will be described specifically based on an embodiment.

Figure 1:
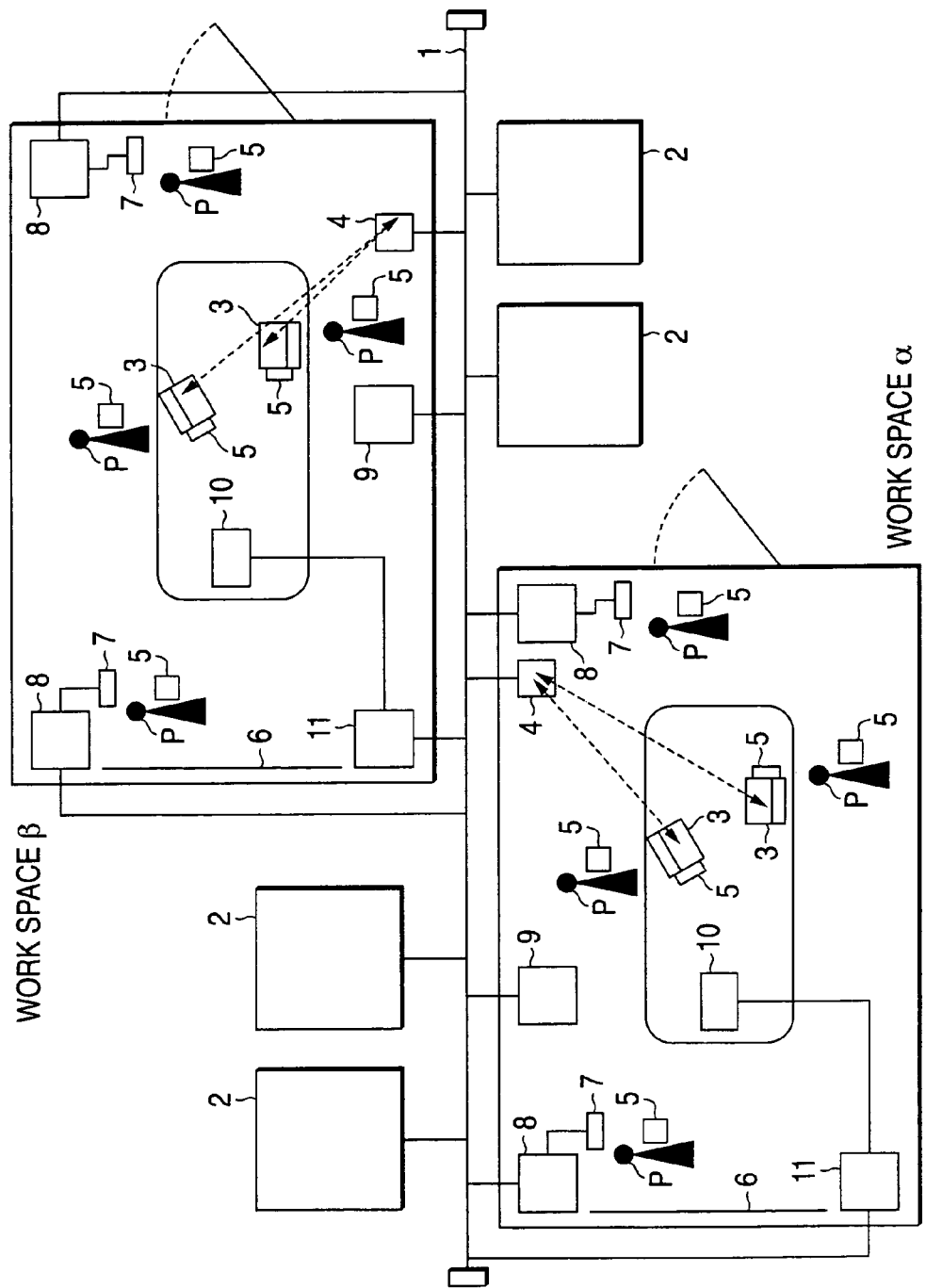
FIG. 1 is a diagram showing a configuration of a work space formation apparatus according to one embodiment of the invention.

FIG. 1 shows a system configuration according to one embodiment of the invention, and shows two work spaces α and β present in mutually remote places. These work spaces α and β are respectively places (environment) in which one or plural users do work, and in these work spaces, computational resources owned by the users (for example, electronic contents, application programs) or various devices carried by the users are linked to other users or various devices present inside the same work space or other work space to form one virtual space for doing group work.

(System Configuration)

Figure 2A:
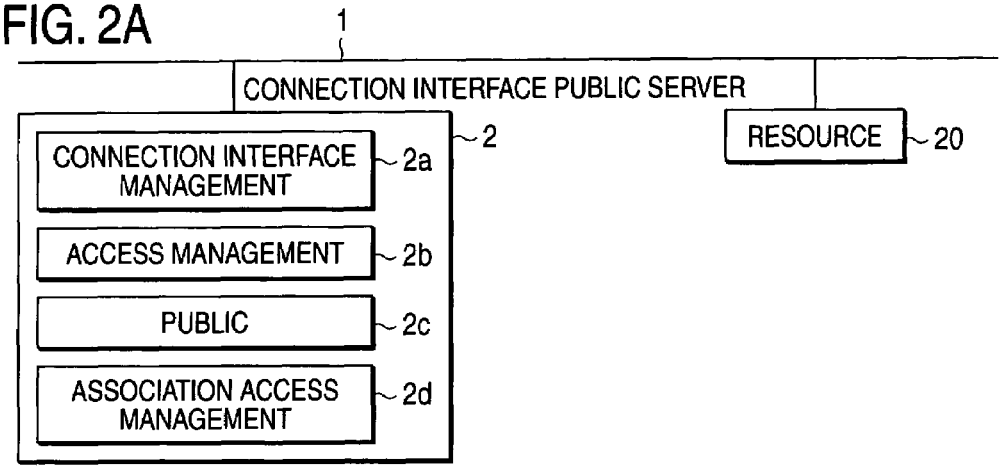
FIGS. 2A to 2C are diagrams showing functional configurations of a connection interface public server, a coordination server and a shared work space server according to one embodiment of the invention.

A connection interface public server 2 connected to a network 1 is allocated to each user P and as shown in FIG. 2A, in addition to public known functions such as a communication function through the network 1, the connection interface public server 2 has a connection interface management function 2a for holding and managing connection interfaces about computational resources which each the user P or a portable device 3 has, a public function 2b for publishing these connection interfaces on the network 1, an access management function 2c for performing authentication in the case of the publication, and an association access management function 2d for holding and managing a coordinating relation between the resources, and the following processing according to the invention is performed.

Incidentally, the connection interface public server 2 may be allocated by one every the user P or the portable device 3, but one connection interface public server 2 may be allocated to plural users P or portable devices 3 and in short, it has only to be able to manage and publish connection interfaces about computational resources which the users P or portable devices 3 have every the user P or the portable device 3.

Also, entities of computational resources according to connection interfaces can be held in the portable device 3 or a server 20 on the network 1 and be accessed by the connection interfaces, but may be held and managed in the connection interface public server 2.

Also, the user P uses various portable computer devices 3 such as a portable telephone or a notebook PC in the work spaces α, β. These portable devices 3 have an I/O interface such as a screen or a pointing device to the user and also have a wireless communication function and are connected to the network 1 through a wireless network base station 4 and connection interfaces about computational resources which the portable device 3 itself has are published on the network 1 by the connection interface public server 2.

That is, the connection interfaces about the computational resources which each the user P or the portable device 3 has are previously registered and managed in the corresponding connection interface public server 2 and are published by the connection interface public server 2.

The user carries an RFID tag 5 corresponding to a personal ID and also an RFID tag 5 corresponding to a computer ID is attached to the portable device.

In various space in which the user works, RFID tag readers 7 are installed in an entrance to a room, the front of a large screen 6 installed inside a room, or a seat and the RFID tag readers 7 detect ID information from the RFID tags 5 and thereby, positional states, for example, "exist inside a room", "be in a presentation", "sit on a seat" about the user P or the portable device 3 are identified and the detected ID information is reported to the connection interface public server 2 and a coordination server 9 through a state detection server 8 connected to the RFID tag readers 7.

By detecting the ID thus, ownership entities of computational resources present in the work space can be identified and the computational resources available in the work space can be identified.

A large screen 6 and a projector 10 for projecting presentation material and further a shared work space server 11 are installed in the work spaces α, β. As shown in FIG. 2C, the shared work space server 11 has a function 11a for holding and managing connection interfaces corresponding to service functions offered by devices installed inside these work spaces and a function 11b for publishing these connection interfaces on the network 1, and can show the functions similar to those of the connection interface public server 2.

Figure 2B:
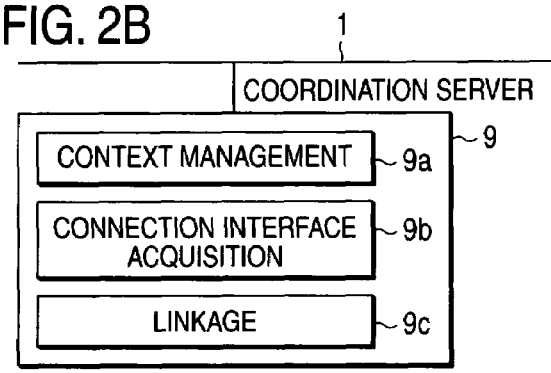
Figure 2C:
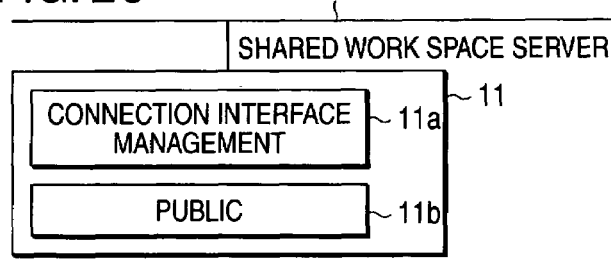

As shown in FIG. 2B, the coordination server 9 provided in the work spaces α, β has a context management function 9a for holding and managing a coordination context of cooperative work space configured by linkage between connection interfaces, a function 9b for acquiring connection interfaces and attached information about computational resources owned by the user or the portable device working inside the work space based on the ID information about the user P or the portable device 3 detected inside each the work space by the RFID tag readers 7 from the corresponding connection interface public server 2 (further, other coordination server), and a coordinating function 9c for coupling computational resources about these connection interfaces and attached information based on the acquired connection interfaces and attached information, and the following processing according to the invention is performed.

Incidentally, the coordination server 9 also has a function for acquiring connection interfaces about service offered by various devices installed inside the work space from the shared work space server 11.

That is, as described below, the coordination server 9 performs coordination processing for making connection so as to perform operation of coordination between contents and application service or between mutual contents of computational resources based on connection interfaces acquired through the network 1 and this linkage also derives a relation with other work space of a remote site. This derived coordinating relation is held and managed as a coordination context of cooperative work space and also is held so that a user can later reproduce and use the coordinating relation by the association access management function 2d of the public server 2. Incidentally, the coordination server 9 acquires the connection interfaces with a credential (an access permit) and thereby, computational resources of the user or the portable device with no relation absent in the collaborative work space are prevented from being linked.

In the present example, the connection interface public server 2, the state detection server 8, the coordination server 9 and the shared work space server 11 for implementing the functions as described above are configured by executing predetermined programs by computer hardware, respectively, but may be configured by a dedicated apparatus.

Also, in the present example, the connection interface public server 2 is provided by numbers in response to the user or the portable device, and the state detection server 8, the coordination server 9 and the shared work space server 11 are provided by numbers in response to the work space, but one apparatus may be used as a set of a function for individually managing each the server or further each the server may be collectivized to perform centralized management by a large server apparatus.

(Processing About Participation of an Object in Work Space and a Fetch of a Connection Interface)

When a user P carrying a portable device 3 enters work space α, an ID tag 5 carried by the user P and an ID tag 5 applied to the portable device 3 are detected by an RFID tag reader 7 installed inside a room (which is the work space α).

Figure 3:
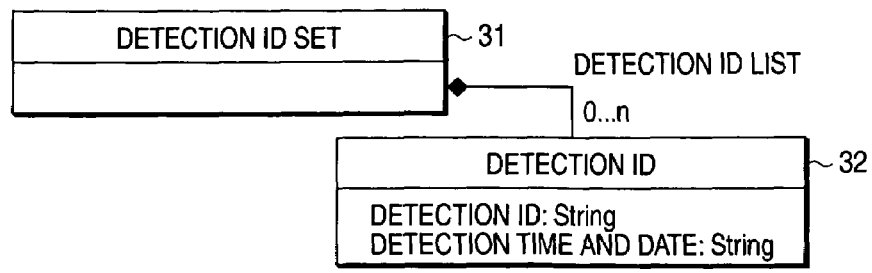
FIG. 3 is a diagram showing an object detection event structure according to one embodiment of the invention.
Figure 4B:
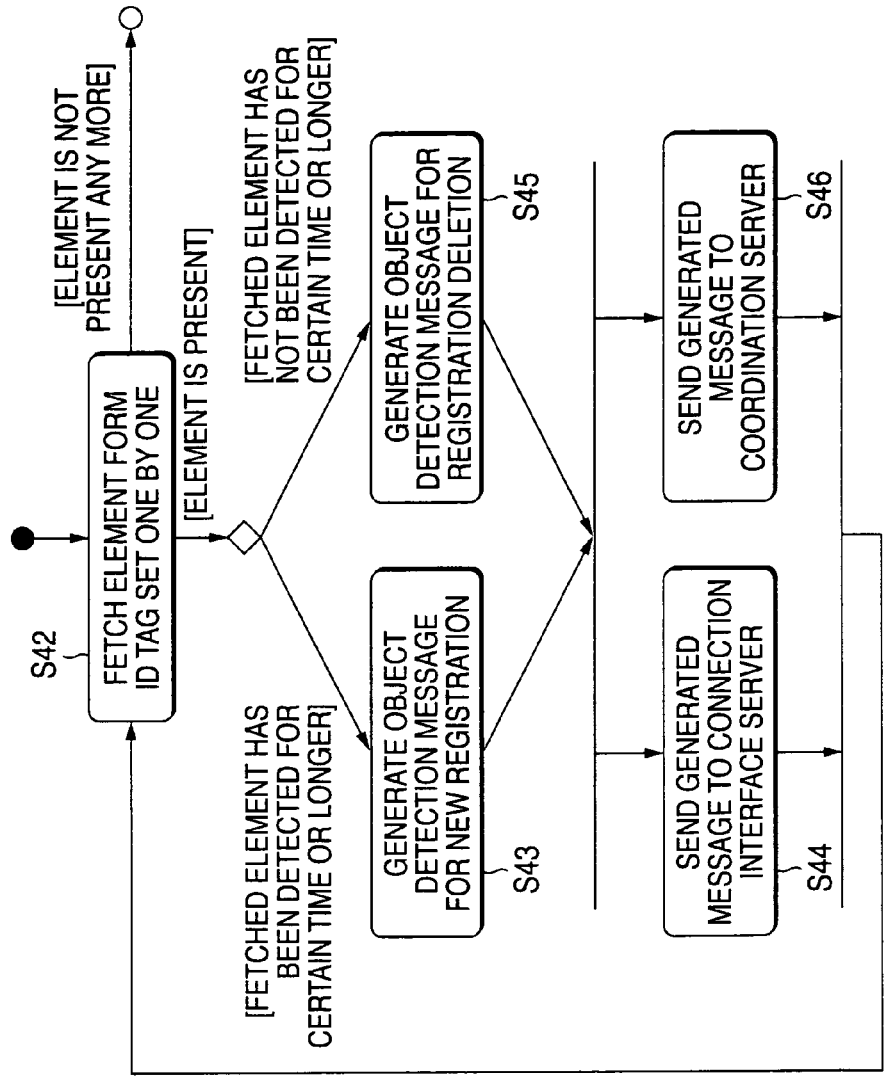
FIGS. 4A and 4 are diagrams describing processing by a state detection server according to one embodiment of the invention.
Figure 4A:
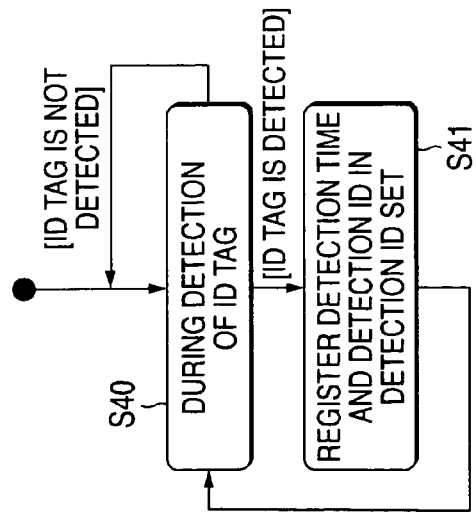

As shown in FIG. 3, a state detection server 8 generates a "detection ID" 32 constructed of a detection ID and detection time and date with respect to a new ID and registers in a "detection ID set" 31 every time the ID tag 5 is detected by the RFID tag reader 7. That is, as shown in FIG. 4A, the state detection server 8 always monitors detection of the ID tag 5 (step S40) and when a new ID which has not been registered ever is detected, the "detection ID" 32 is registered in the "detection ID set" 31 (step S41).

Also, the state detection server 8 updates the detection time and date of the corresponding "detection ID" 32 with respect to the existing ID. That is, as shown in FIG. 4B, the state detection server 8 makes a check based on a certain time preset with respect to all the "detection IDs" 32 registered in the "detection ID set" 31 (step S42) and sees the "detection time and date" with respect to the "detection ID" 32 corresponding to an ID detected and when the ID has been detected continuously or intermittently for the certain time or longer inside the work space α, an object detection message 51 of an XML format as shown in FIG. 5A for providing notification that the ID is recognized as a new element constructing the work space α is generated (step S43), and a coordination server 9 and a connection interface public server 2 are notified of the object detection message as a POST message of a HTTP protocol (steps S44 and S46).

The object detection message is a message for providing notification that a worker P or a portable device 3 corresponding to the ID is detected as an object present in the work space α, and the object detection message 51 sent by the state detection server 8 includes a <messageid> element acting as an identifier of a message, a <status> element indicating a detection status, an <objectid> element acting as an identifier of an object detected, a <credential> element acting as an access permit, a <datetime> element indicating the time and date detected and a <tagreaderid> element acting as an identifier of a tag reader 7 detected, and "detected" is set as a value of the <status> element in order to provide notification that detection is performed newly.

Incidentally, in the object detection message sending processing described above, the object detection message 51 is sent to the coordination server 9 corresponding to the work space α and the connection interface public server 2 corresponding to an object detected, and the state detection server 8 has a table of correspondence between IDs and addresses of the connection interface public servers 2 corresponding to individual objects and makes a decision from ID information held by the ID tag 5 to perform the sending processing.

Also, the ID includes information about "object types (such as person, device, electronic document, video)" and "object identifier", and further a numeric value capable of mapping to a file name and an address of a server for holding an active history of the object is given to the "object identifier".

Figure 6B:
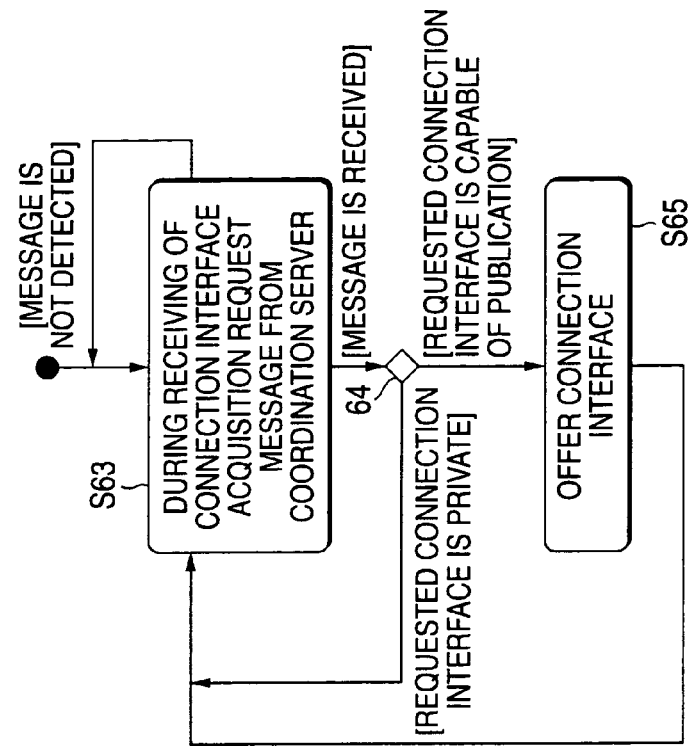
FIGS. 6A and 6B are diagrams describing processing by the connection interface public server according to one embodiment of the invention.
Figure 6A:
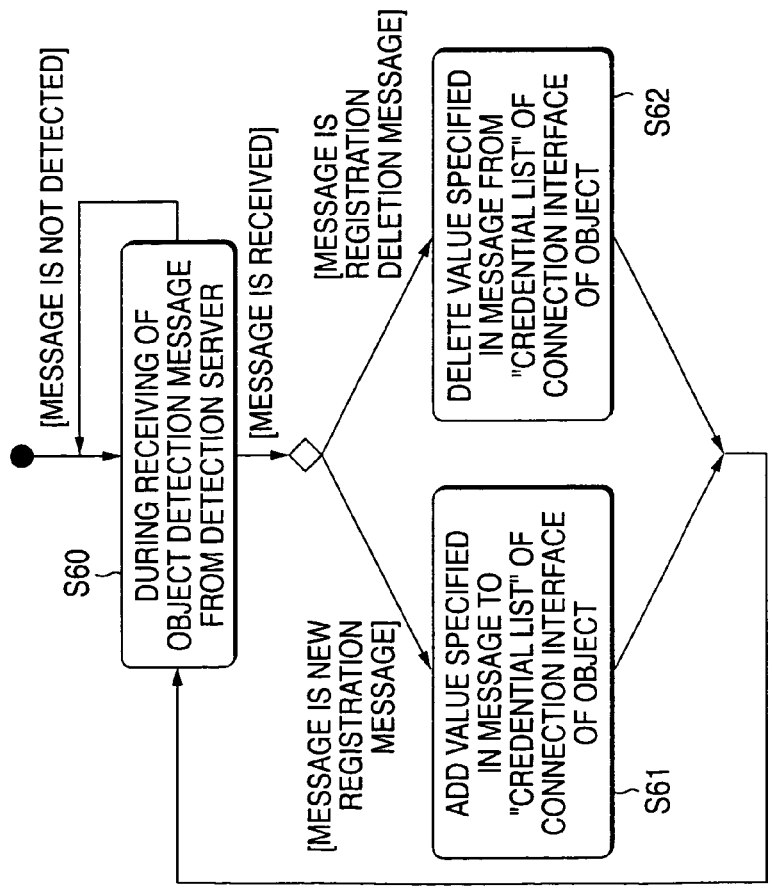

On the other hand, when the connection interface public server 2 receives the object detection message 51 from the state detection server 8, processing for setting a credential is implemented on Java Servlet in order to publish a connection interface safely as shown in FIG. 6A. That is, when the connection interface public server 2 receives the object detection message 51 from the state detection server 8 (step S60), a credential included in the object detection message is registered in a "credential" held by a connection interface corresponding to the detection ID held by the connection interface public server 2 (step S61).

Therefore, when it is detected that an object is present inside the work space α, a credential for proving that it is present inside the work space α is registered with respect to a connection interface about a calculation resource owned by the object.

Here, the connection interface public server 2 also owns a connection interface about a calculation resource owned by the portable device 3 in addition to the connection interface about the computational resource which the connection interface public server 2 owns every the user P and in short, owns a connection interface for accessing an entity of a computational resource corresponding to an ID held in any place.

Figure 7:
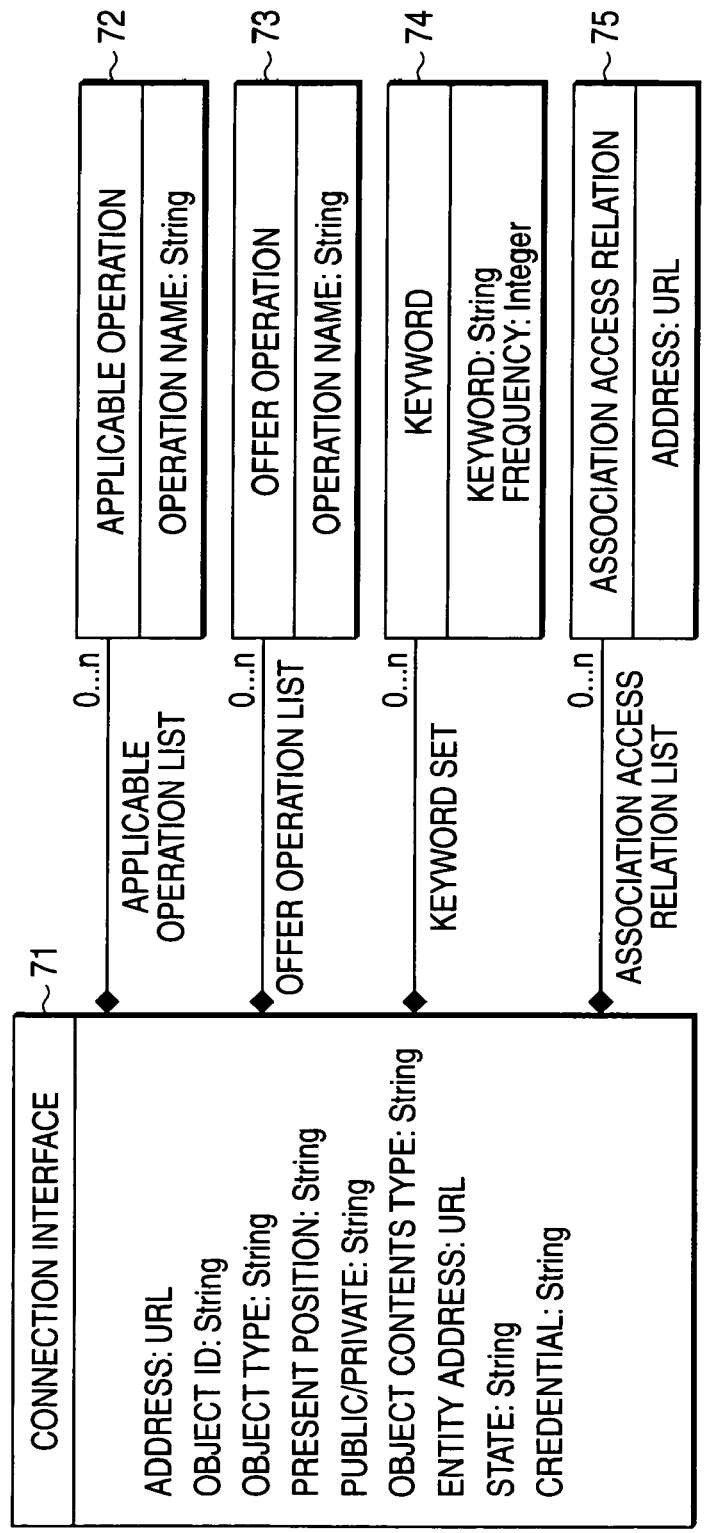
FIG. 7 is a diagram showing a structure of a connection interface according to one embodiment of the invention.

As shown in FIG. 7, a self address URL, an ID of a corresponding object, an object type, a kind of public/private, a contents type, an entity address URL of a corresponding computational resource, a state and a credential are set in a connection interface 71, and also an operation name 72 applicable to the corresponding computational resource, an operation name 73 offered by the corresponding computational resource, a keyword 74 given to the corresponding computational resource, a keyword given to the corresponding computational resource and an association access relation 75 based on a coordinating relation with a computational resource held by another connection interface public server are respectively attached as a list.

Figure 8:
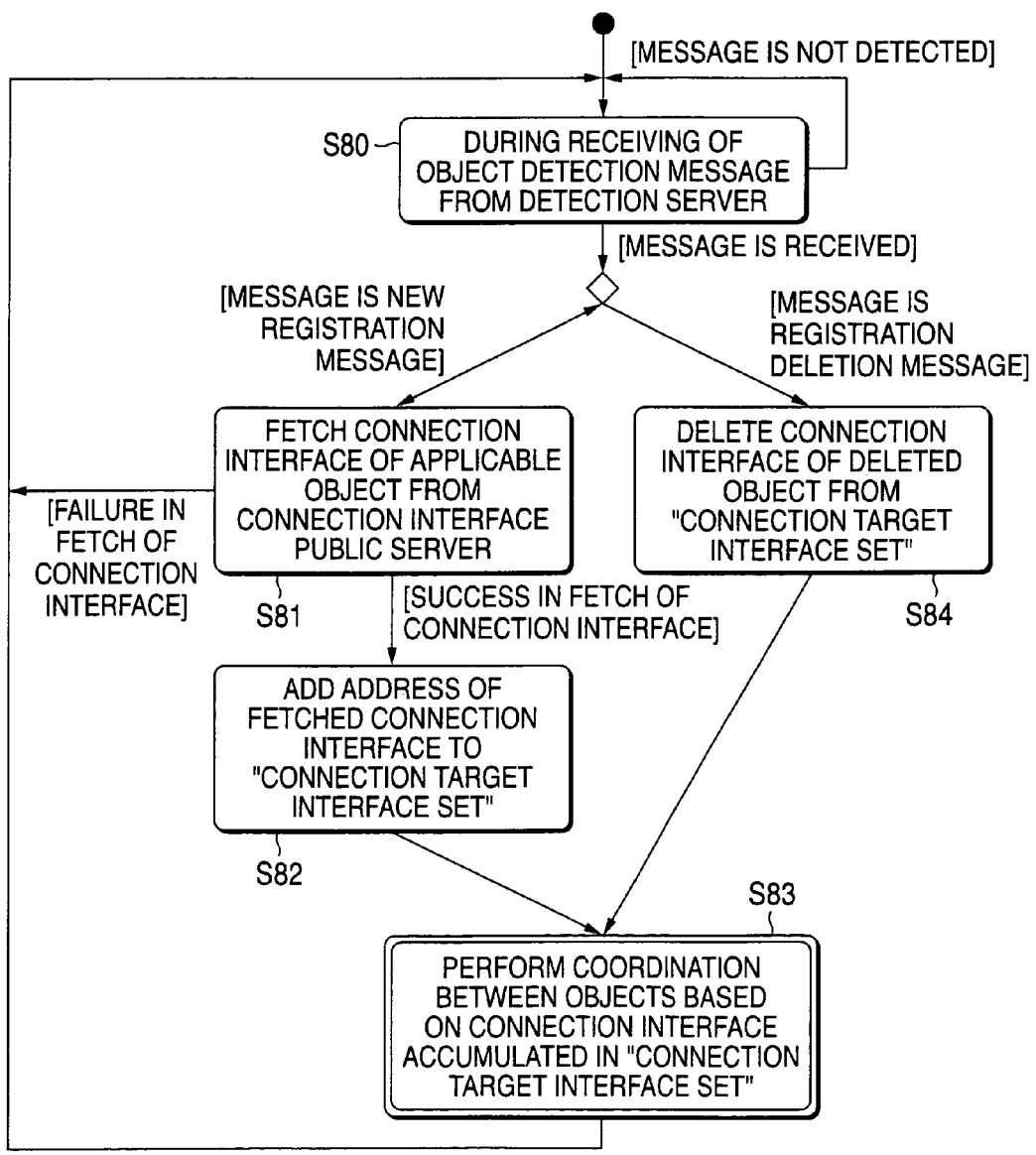
FIG. 8 is a diagram describing processing by the coordination server according to one embodiment of the invention.

On the other hand, as shown in FIG. 8, when a new object is detected in the coordination server 9 (step S80), a connection interface about the object and the attached information are acquired from the corresponding connection interface public server 2 through the network 1 (step S81) and processing for performing coordination between objects is implemented on Java (registered trademark) Servlet.

In the present example, when the object detection message 51 sent from the state detection server 8 as a POST message of HTTP is received from the state detection server 8, a connection interface acquisition request is sent to the connection interface public server 2 as a POST message of a HTTP protocol. Incidentally, the coordination server 9 also considers a time difference at which a message arrives and sends a connection interface acquisition request message including a credential of the object to the connection interface public server 2 at regular time intervals even in case of failing in acquisition of a connection interface.

On the other hand, in the connection interface public server 2 receiving the POST message about the connection interface acquisition request message, processing for offering a connection interface to the coordination server 9 is implemented on Java (registered trademark) Servlet as shown in FIG. 6B.

In the present example, when the connection interface acquisition request message sent from the coordination server 9 as a POST message is received (step S63), it is first checked whether or not a connection interface in which the acquisition request has occurred is a connection interface capable of publication by referring to a "public/private" element set in the connection interface 71 (step S64).

That is, in the case that a connection interface of a computational resource owned by an user P or a portable device 3 is registered in the public server 2, it is constructed so that the user can set whether or not to publish the computational resource for coordination.

As a result of this, in the case of the connection interface capable of publication, a value of a "credential" element set in the connection interface 71 is compared with a value of a credential in an object acquisition request message sent from the coordination server 9 and when their values match, it is recognized that it is a connection request sent from the work space α in which the object is currently present and an address URL for referring to the connection interface 71 requested as a connection interface response is returned to the coordination server 9 of a request source as a POST message (step S65).

That is, a credential managed by the connection interface public server 2 and a credential presented by the coordination server 9 are issued and posted to these servers 2, 9 when the state detection server 8 detects entrance to the work space of an object, and it is ensured that a connection interface and attached information which the coordination server 9 acquires from the connection interface public server 2 for linkage processing are involved in the work space by authenticating a match between the credentials.

Figure 9:
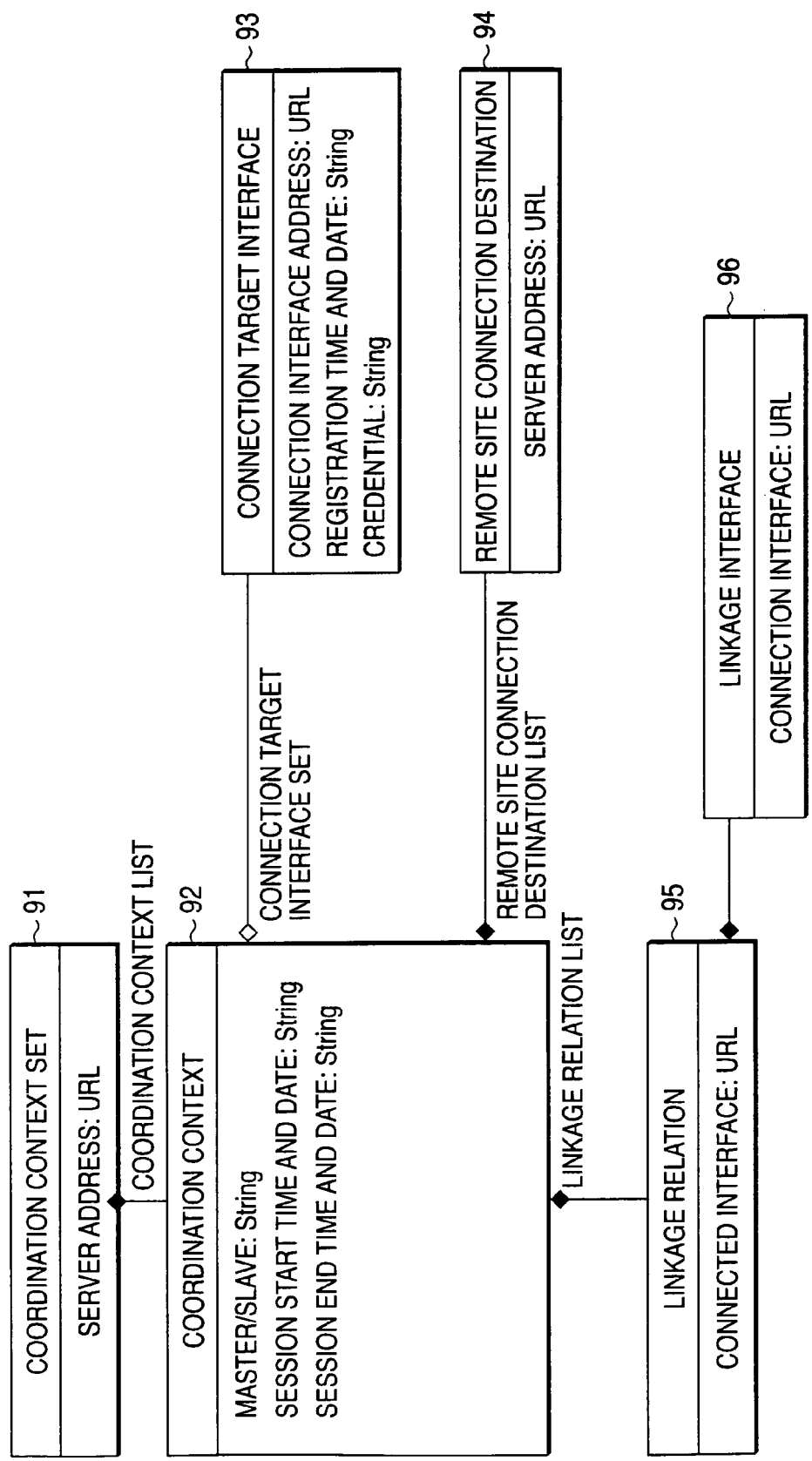
FIG. 9 is a diagram showing a structure of a coordination context according to one embodiment of the invention.

On the other hand, as shown in FIG. 8, when the coordination server 9 receives data of a connection interface from the connection interface public server 2 (step S81), information about the connection interface is registered and managed as data of a coordination context as shown in FIG. 9.

As shown in FIG. 9, the data of the coordination context forms a context set 91 identified by an address URL of the coordination server 9 and the context set 91 includes a list of a coordination context 92 for linking plural connection interfaces (calculation resources).

A "master/slave" element indicating a master/slave relation with another coordination server, a "session start time" element, a "session end time" element and a "state" element are set in each the coordination context 92, and also a connection target interface set 93 of a connection target of the coordination session, a "remote site connection destination" 94 including an address URL of another coordination server in the case of connecting to another remote work space, a "coordinating relation" 95 including a connected interface URL acting as a linkage list and a "linkage interface" 96 including the connection interface URL are attached.

That is, when the coordination server 9 receives data of a connection interface from the connection interface public server 2 as described above (step S81), a "connection target interface" 93 in which a URL of the connection interface is set as a "connection interface address" and the time and date at which the processing is performed is set as "registration time and date" and a credential used in a fetch of the connection interface from the connection interface public server is set as a "credential" is generated and is registered in a connection target interface set (step S82).

Then, the coordination server 9 performs processing of coordination between objects based on the connection interfaces registered and accumulated in the connection target interface set (step S83), but this will be described below.

(Processing about an exit of an object from work space)

When a user P carrying a portable device 3 exits from work space α, an ID tag 5 carried by the user and an ID tag 5 provided in the portable device 3 are not detected by an RFID tag reader 7 installed inside a room.

As shown in FIG. 4B, a state detection server 8 sees and always monitors a "detection ID set" 31 managed by itself and when presence of the ID tag 5 applicable has not been detected for a certain time or longer, an object detection message 52 for registration deletion for providing notification that the ID becomes invalid as an element constructing the work space α is generated (step S45), and a corresponding coordination server 9 and a connection interface public server 2 are notified of the object detection message as a POST message (step S46).

Here, as shown in FIG. 5B, the object detection message 52 for registration deletion includes a <messageid> element acting as an identifier of a message, a <status> element indicating a detection status, an <objectid> element acting as an identifier of an object, a <credential> element acting as an access permit, a <datetime> element indicating the time and date at which the presence has not been detected and a <tagreaderid> element acting as an identifier of a tag reader, and "disappeared" is set as a value of the <status> element in order to provide notification that the presence has not been detected.

As shown in FIG. 6A, the connection interface public server 2 receiving the object detection message 52 about registration deletion as a POST message clears a "credential" of a connection interface 71 about the object (step S62) and sets the fact that a connection interface according to the ID is not valid in the work space α.

Also, as shown in FIG. 8, the coordination server 9 receiving the object detection message 52 about registration deletion as a POST message deletes entry of a connection target interface 93 corresponding to the detected object from a connection target interface set of a coordination context (step S84) and sets the fact that a connection interface according to the ID is not used in the work space α.

(Detection of a Coordination Context)

In connection target interfaces 93 registered in a connection target interface set held by a coordination server 9, it is checked whether or not connection target interfaces have changed by a certain ratio or more within a certain time when the connection target interfaces are registered or deleted. As a result, when it is detected that the connection target interfaces have changed by the certain ratio or more, it is recognized that a situation of cooperative work has changed. In other words, when it is assumed that unit time is T and the number of connection interfaces registered or deleted is n, in the case that a value f given by an expression f=n/T exceeds a certain or larger value C, namely in the case of f>C, it is recognized that the situation of cooperative work has been changed.

Figure 10:
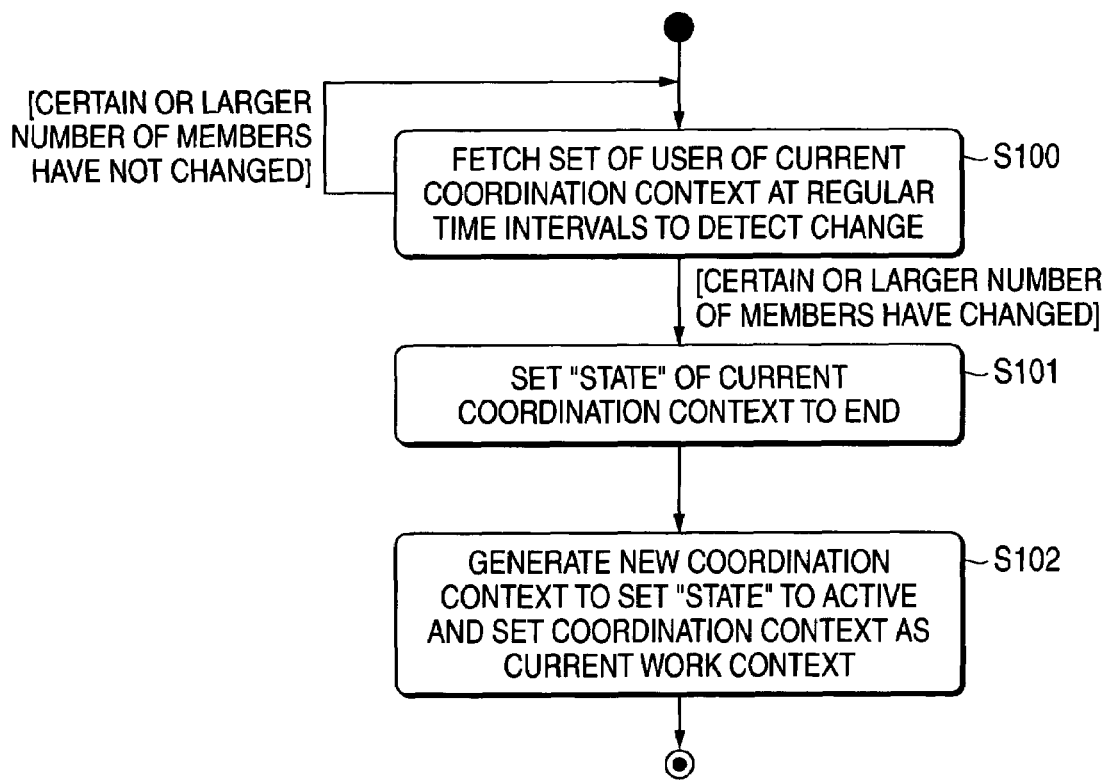
FIG. 10 is a diagram describing switching processing of the coordination context according to one embodiment of the invention.

That is, as shown in FIG. 10, the coordination server 9 monitors a change in connection target interfaces (that is, an user or a portable device) managed by itself (step S100) and when a decrease in a certain or larger number of members (connection interfaces) preset occurs, the current time is set to the end time of the current coordination context 92 and a state is set to "end" (step S101). Then, a new coordination context 92 is generated and the current time is set to the start time and a state is set to "active" and further, this generated coordination context 92 is set as the current coordination context (step S102).

Therefore, when a cooperative work session of a meeting etc. ends, a coordination context for the next meeting is prepared.

(Processing of Coordination Between Objects)

Figure 11:
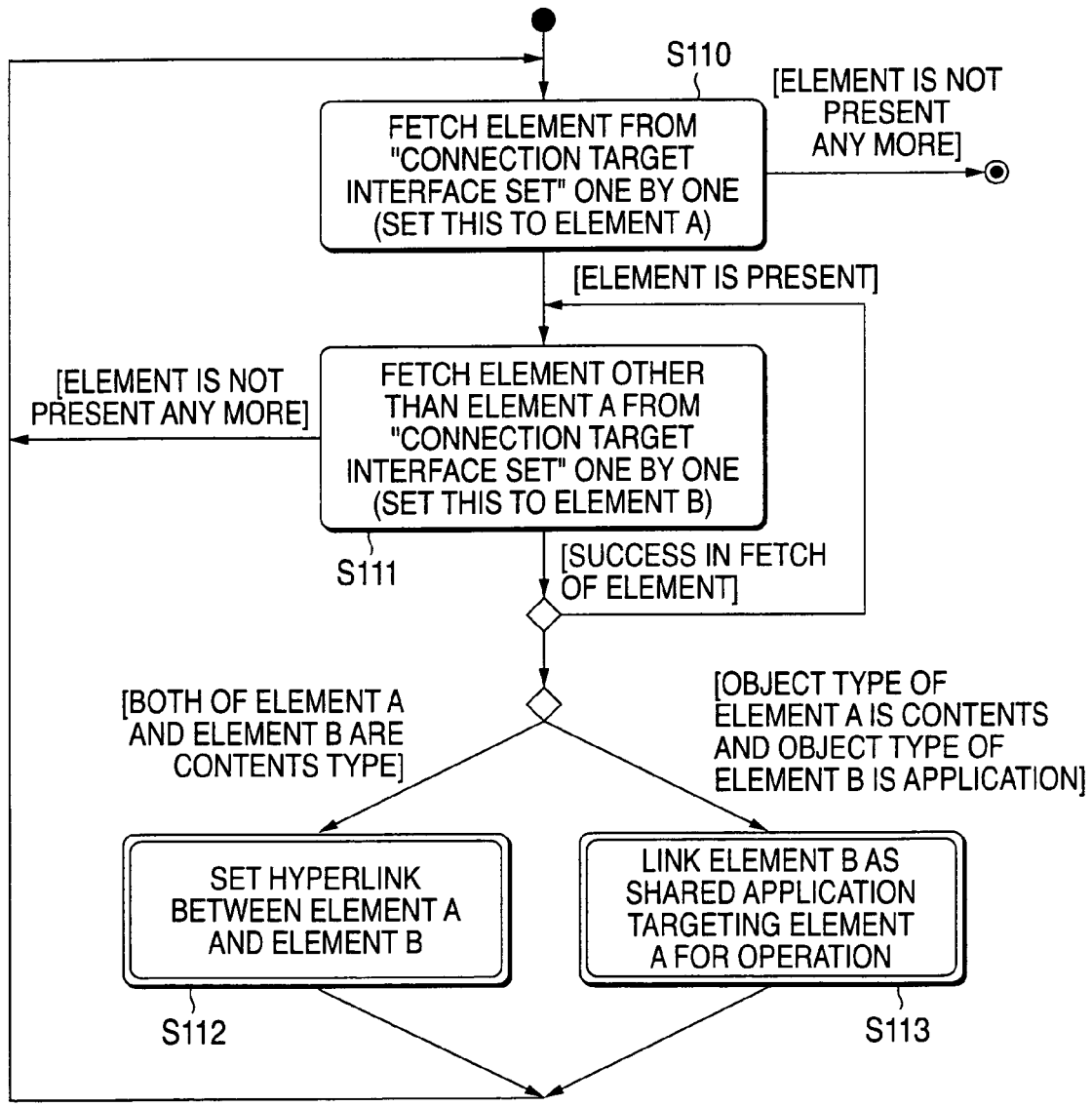
FIG. 11 is a diagram describing coordination processing between objects of the coordination context according to one embodiment of the invention.
Figure 12:
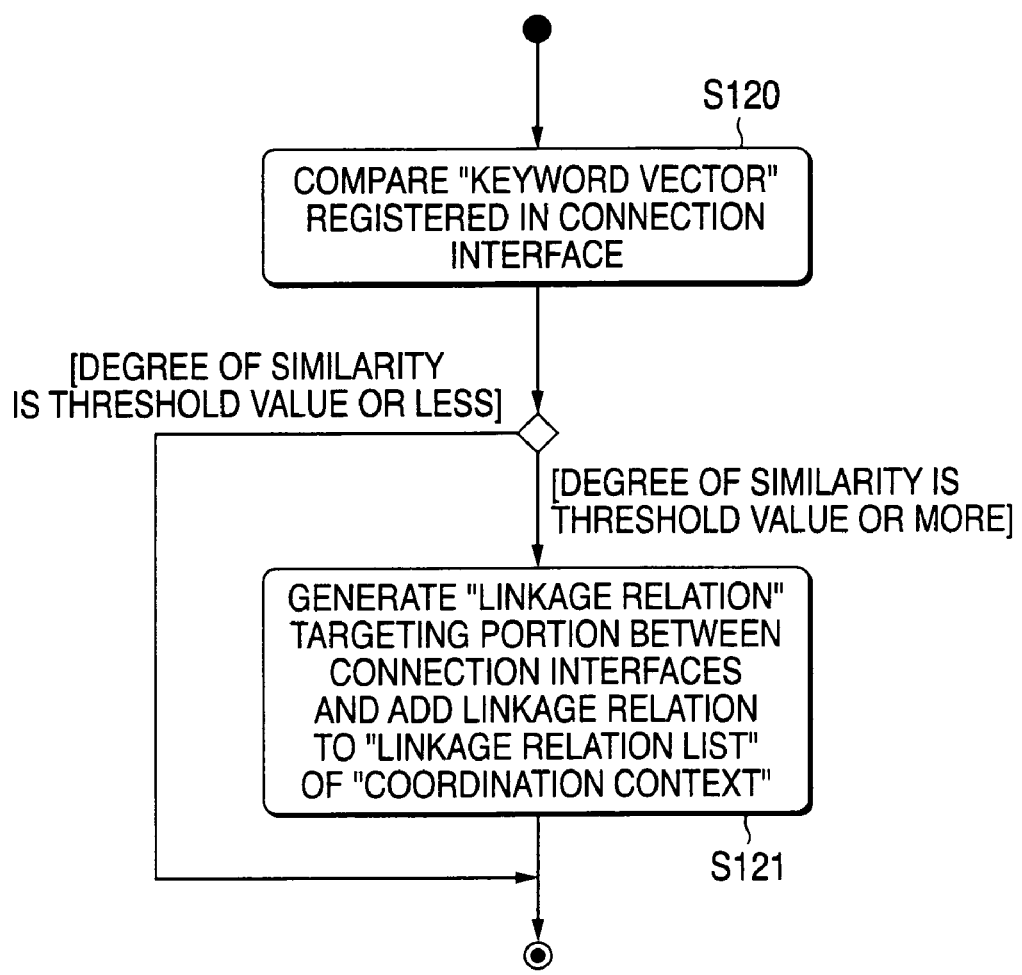
FIG. 12 is a diagram describing processing for linking mutual contents by a hyperlink according to one embodiment of the invention.
Figure 13:
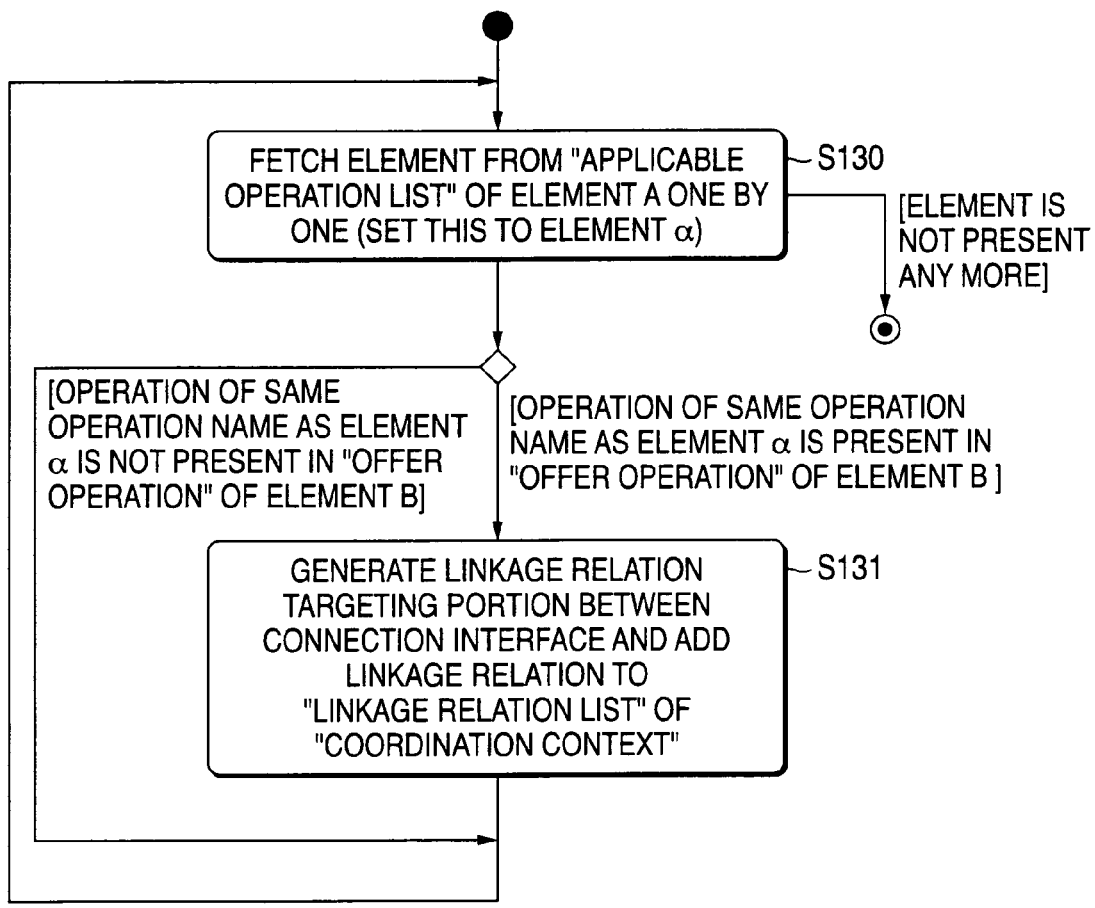
FIG. 13 is a diagram describing processing for linking contents to application components according to one embodiment of the invention.

When a connection interface is added to or deleted from a set of connection target interfaces 93 held by a coordination server 9, a linkage relation targeted for all the connection target interfaces 93 registered in the connection target interface set is collated and calculation for deriving the coordinating relation is performed by the coordination server 9 as shown in FIGS. 11 to 13.

That is, derivation processing of the coordinating relation is performed using a change in objects inside work space targeted as a trigger.

As shown in FIG. 11, in the derivation processing of the coordinating relation, two connection target interfaces are fetched from a set of connection target interfaces 93 (steps S110, S111) and coordination process of two kinds shown in FIG. 12 or FIG. 13 is performed depending on a difference in an object type of an object of a linkage target indicated by the connection target interface (steps S112, S113).

Incidentally, in the present example, as object types, any of User showing a user, Device showing various devices, Contents showing electronic contents, Application showing an application component are set as data of a connection interface 71 shown in FIG. 7, and information about these object types is acquired from a corresponding connection interface public server 2 as attached information about the connection interface. That is, the coordination processing is performed based on data acquired from the connection interface public server 2 through credential authentication by the coordination server.

First, in the coordination server 9, when both of two connection target interfaces fetched are "Contents" types as the object types (step S112), as shown in FIG. 12, the degree of similarity between these objects is calculated (step S120) and when the degree of similarity is a certain threshold value or more, a hyperlink in which these objects can associatively access mutually is set (step S121).

Specifically, in the connection interface 71 which the connection interface public server 2 publishes corresponding to each the object, a "keyword" and its "frequency" in which the contents of contents are extracted previously using natural language processing are held as a keyword set 74. The feature amounts of contents of objects ci, cj corresponding to the two connection target interfaces fetched from this keyword set can be expressed as keyword vectors vi, vj expressed by the following expressions.

$$vi=(wi^1, wi^2, \ldots wi^M)$$

$$vj=(wj^1, Wj^2, \ldots wj^M)$$

Here, $wi^N$ ($wj^N$) are real numbers in which contents ci (cj) show significance about a keyword KN.

A vector distance dij (that is, an absolute value of vi-vj) between the objects ci, cj is calculated from the keyword vectors expressed thus.

Then, when this distance is larger than a certain threshold value D, it is considered that there is a strong relation between these contents documents, and a linkage relation 53 having the two connection interfaces as an element of a linkage interface 96 is generated and registered in a linkage relation list 95 inside the current coordination context 92. That is, by linkage of the connection interfaces, relevant calculation resources available in shared work space can be coupled and used and, for example, when one contents document is displayed on a screen of a device, a list of another contents document relevant to this is also displayed on the screen and when a user makes a selection from the list, the relevant document is displayed on the screen.

Also, a corresponding connection interface public server 2 is notified of this coordinating relation, and an association access relation having URL addresses of mutual connection interfaces as values respectively is generated and registered in an association access relation list 75 of the connection interface 71 held by the connection interface public server 2 of the two objects.

This association access relation 75 can be used as a history of a coordinating resource owned by a device or another user in which a user has done cooperative work, and this history can be utilized for information sharing or information interchange between the users by referring to the history.

On the other hand, when one of the two connection target interfaces fetched is a "Contents" type as an object type and the other is an "APPLICATION" type (step S113), as shown in FIG. 13, an "operation name" of offer operation registered in an offer operation list 73 of the connection interface 71 corresponding to the connection target interface of Application type is collated with an "operation name" applicable to the contents document of an applicable operation list 72 of the connection interface 71 corresponding to the connection target interface of Contents type (step S130).

As a result of this, when an operation name registered in the offer operation 73 is present in a list of the applicable operation 72, a coordinating relation can be set between both the connection target interfaces, and a coordinating relation 93 having the two connection interfaces as an element of a linkage interface 96 is generated and registered in a coordinating relation list 95 inside the current coordination context 92 (step S131).

When the registration processing described above is completed, an entity address in the connection interface 71 corresponding to the two connection target interfaces is fetched and a message of an operation command is interchanged between contents and an application registered in this address. Incidentally, two or more connection interfaces can also be linked by similar processing.

Figure 14:
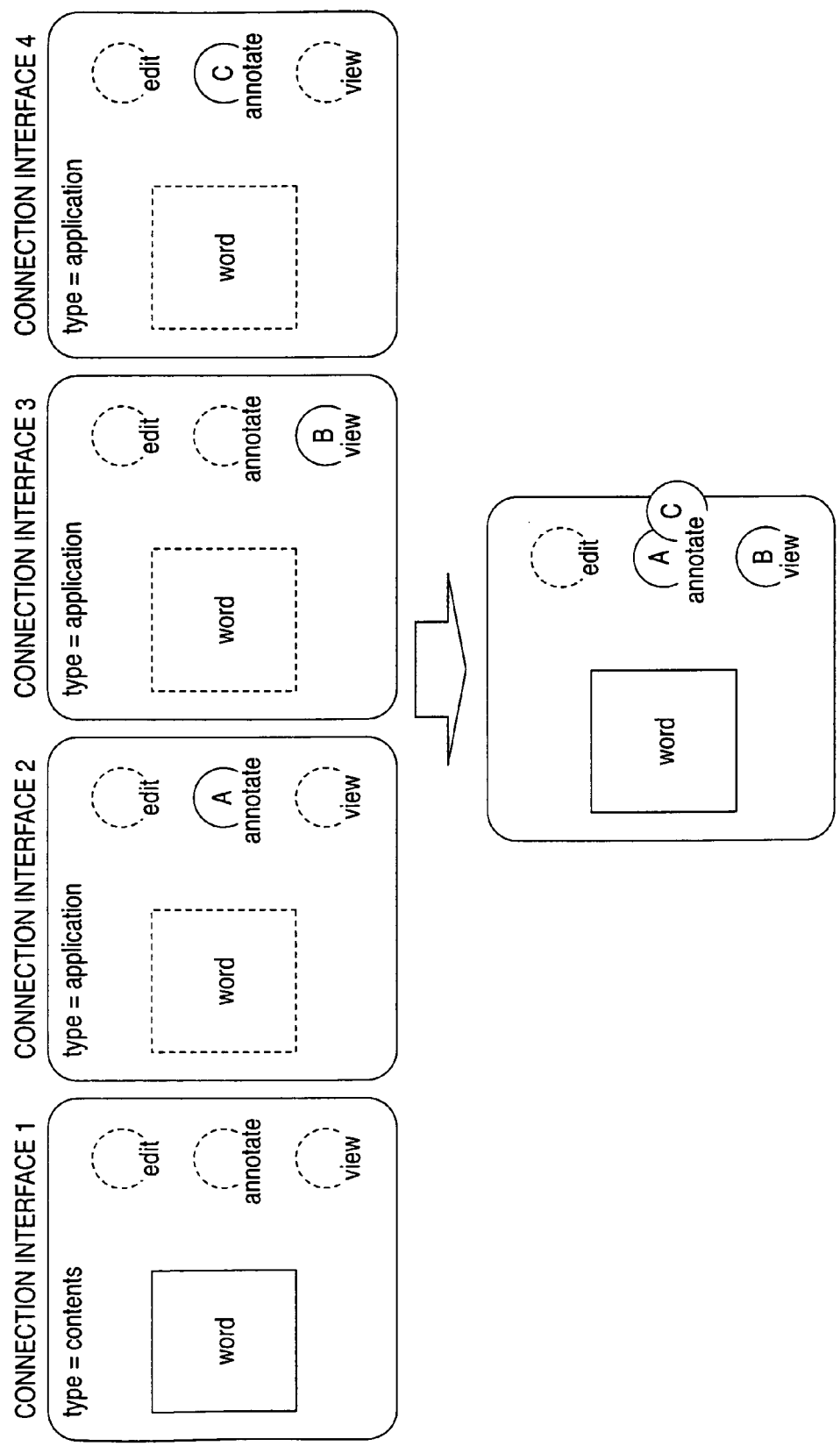
FIG. 14 is a diagram describing coupling of contents to application components according to one embodiment of the invention.

For example, as shown in FIG. 14, when a connection interface 1 of Contents type having "edit", "annotate", "view" as applicable operation, a connection interface 2 of Application type having "annotate" as offer operation, a connection interface 3 of Application type having "view" as offer operation and a connection interface 4 of Application type having "annotate" as offer operation are linked, annotation editing processing by an application program which is an entity of the connection interface 2 or 4 or viewing processing by an application program which is an entity of the connection interface 3 can be performed with respect to a contents document which is an entity of the connection interface 1.

Incidentally, in the present example, an operation command is implemented on a framework of XML/SOAP and messages of a command string expressed in a format of XML are sent from the application side to the contents side and in the contents side, the messages sent from each the application side are queued and interpreted by a command interpreter prepared and thereby shared operation to common contents can be performed.

(Linkage Processing of Plural Work Spaces of a Remote Site)

Figure 15A:
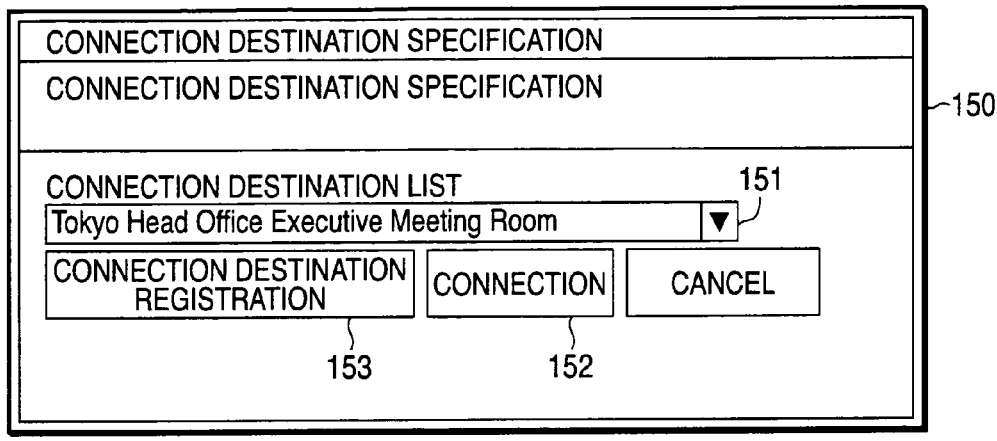
FIGS. 15A and 15B are diagrams showing an interface screen according to one embodiment of the invention.
Figure 15B:
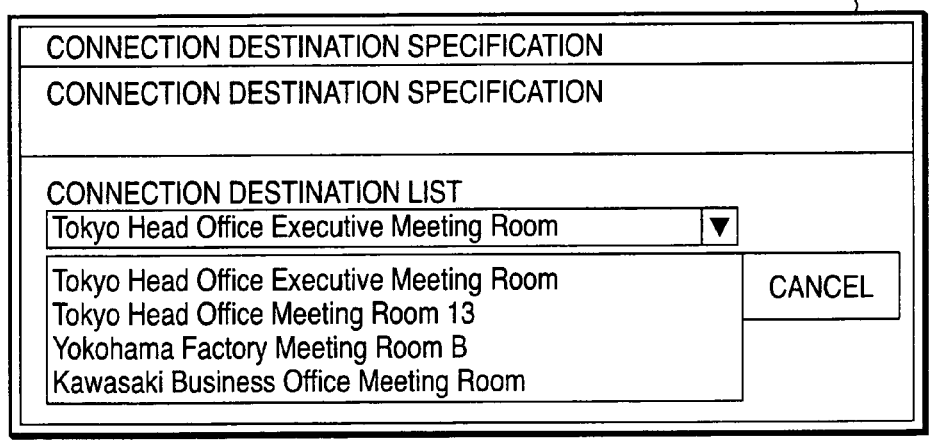

In processing for constructing remote cooperative work space by connecting work space α to another work space β present at a remote site, a user P operates a portable device 3 and activates a user interface 150 for connection as shown in FIG. 15A to display the user interface 150 on the screen and selects the work space β which is a connection destination from a pull-down menu 151 as shown in FIG. 15B and pushes a "connection" button 152 and thereby the processing is started.

Figure 16:
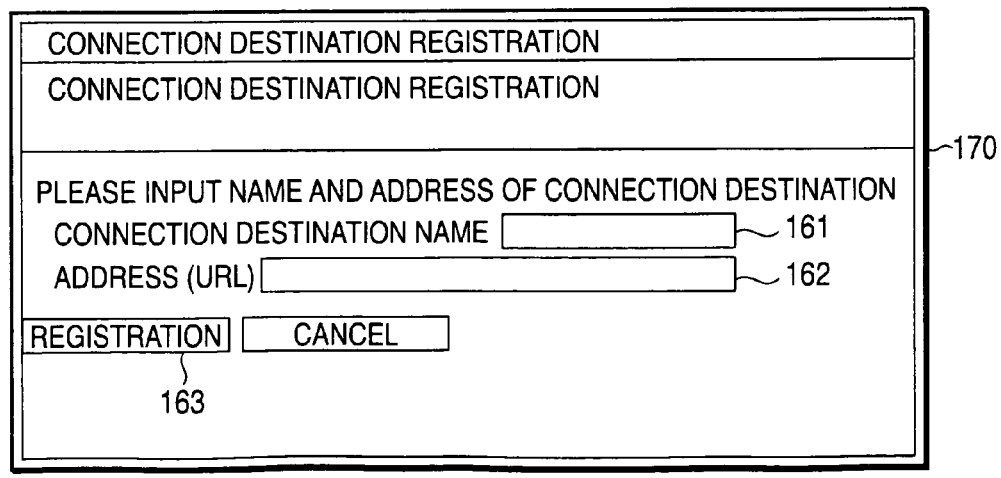
FIG. 16 is a diagram showing an interface screen according to one embodiment of the invention.

Incidentally, in the case that desired work space which is a connection destination is not present in the pull-down menu 151, when a "connection destination registration" button 153 is pushed, a user interface 160 for new connection destination registration as shown in FIG. 16 is opened on the screen and when a connection destination name 161 and a connection destination address 162 are inputted herein and a "registration" button 163 is pushed, the connection destination registered can be selected from the pull-down menu 151 of the user interface 150 for connection.

Figure 17A:
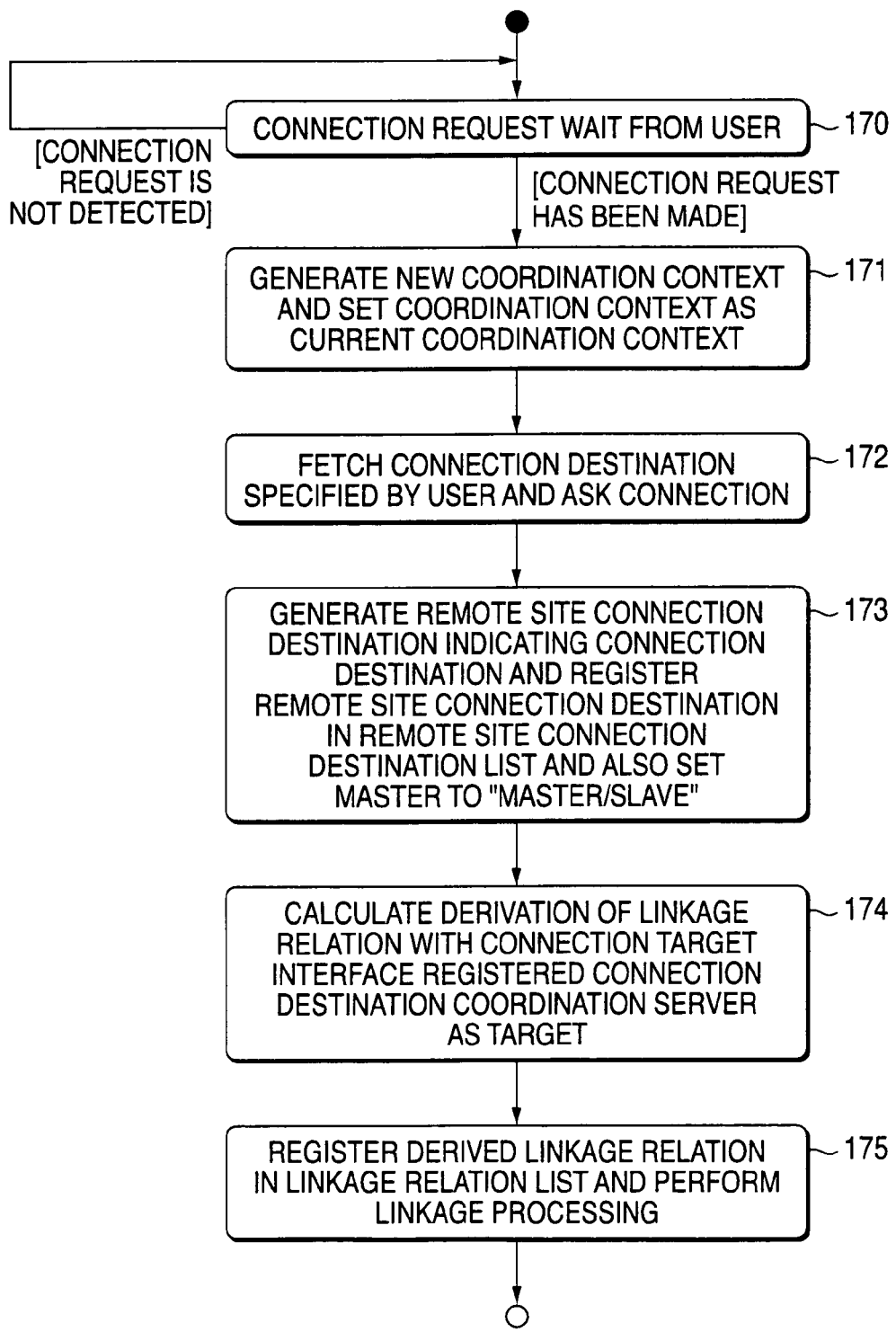
FIGS. 17A and 17B are diagrams describing processing of connection to work space of a remote site according to one embodiment of the invention.

When the work space β is selected as the connection destination and the "connection" button 152 is pushed, in a coordination server 9 corresponding to the work space α in which the user P is present, as shown in FIG. 17A, a new coordination context 92 is generated in response to the connection request (step S170) and is set as the current coordination context 92 (step S171). Then, the coordination server 9 corresponding to the work space α fetches an address of the work space β selected by the user P, and asks connection from a coordination server 9 corresponding to the work space β through a network 1 (step S172).

Figure 17B:
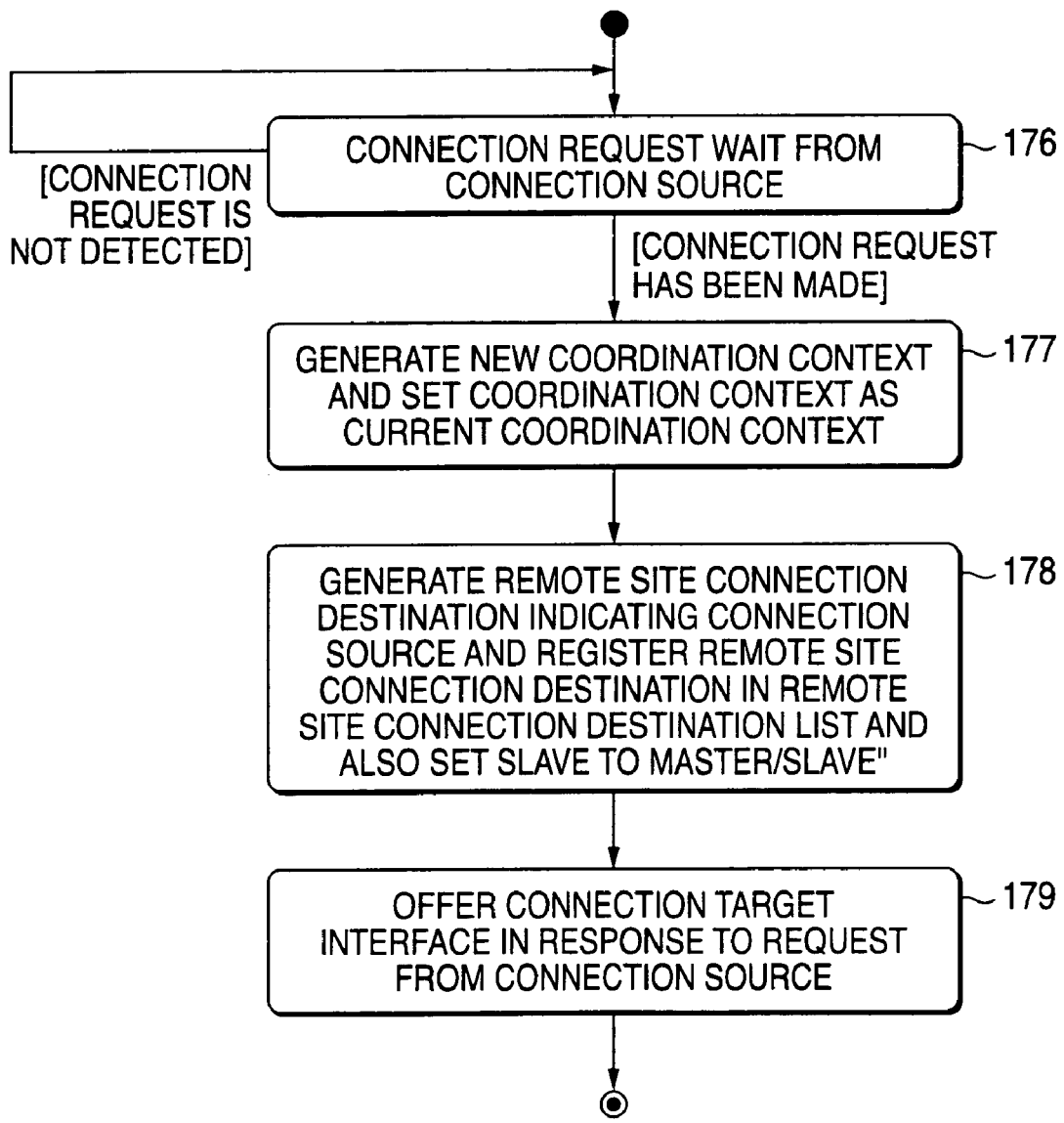

In the coordination server 9 corresponding to the work space β, as shown in FIG. 17B, in the case of receiving the connection request (step S176), a new coordination context 92 is generated in a self context set 92 and is set as the current coordination context 92 of the side of the work space β (step S177).

Also, with this, in both the coordination servers 9, a remote site connection destination 94 in which an address URL of the mutual coordination servers is specified as a "server address" is generated and registered in a remote site connection destination list of the respective context 92. As a result of this, connection between the coordination servers 9 of work spaces α and β can be made.

Further, in the coordination server 9 resulting in a connection source (work space α), a value of "Master" indicating the master side is set to "master/slave" of the coordination context 92 (step S173) and in the coordination server 9 resulting in a connection destination (work space β), a value of "Slave" indicating the slave side is set to "master/slave" of the coordination context 92 (step S178).

When the connection processing described above is completed, the coordination server 9 of the work space α which is a connection source (master) fetches connection target interfaces 93 of a "connection target interface set" present in a context 92 held by the coordination server 9 of a connection destination (slave) through the network 1, and calculation for deriving the coordinating relation as described above is performed with their fetched connection interfaces as a target (step S174) and the derived coordinating relation is registered and held in the coordination server 9 of the master side (step S175). Incidentally, the coordination server 9 of the master side performs processing of connection between objects of a connection target in a batch.

Incidentally, in the case of making connection among three or more places, a coordination server 9 of the first connection source results in a master and fetches connection target interfaces held by the other coordination servers 9 of a connection destination resulting in a slave and thereby, it has only to perform calculation of the coordinating relation in a manner similar to that described above.

Therefore, computational resources used in the remote work space β are managed in a manner similar to that described above by the coordination server 9 for managing the work space, so that the computational resources available in the work space β can be coupled and used in the work space α by making connections including connection interfaces of the work space β using the work space α described above as the master side.

Here, when disconnection of a connection relation is instructed by the user P of the work space α or the work space β, each the coordination server 9having the connection relation sends a message of a disconnection request to the coordination server 9 of a connection destination registered in the remote site connection destination list 94 of the coordination context 92, and the coordination servers 9 of a disconnection request source and a disconnection request destination delete the connection destination from the remote site connection destination list 94 held by the coordination context 92.

(Processing for Associatively Fetching Information Mutually)

Figure 18:
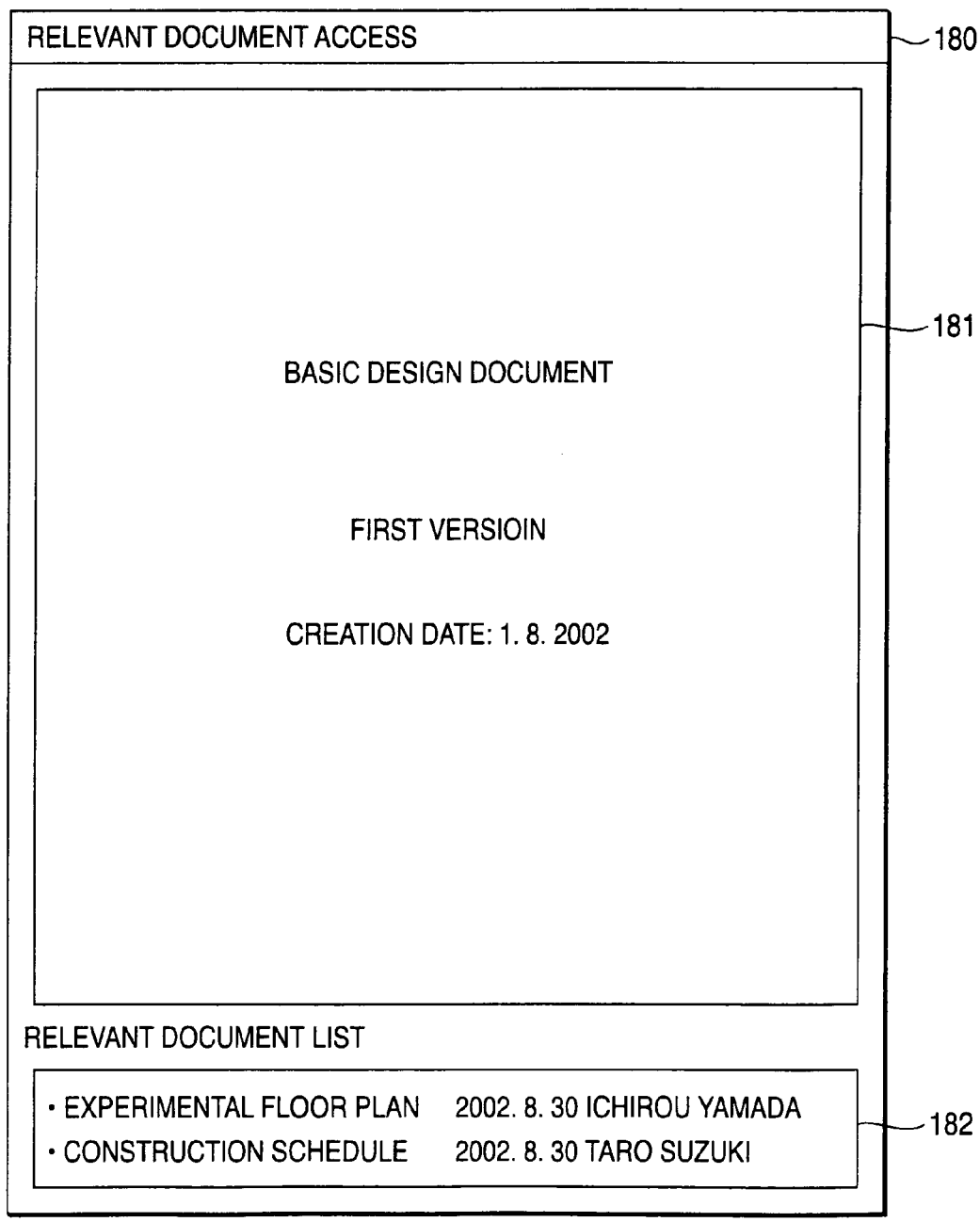
FIG. 18 is a diagram showing an interface screen according to one embodiment of the invention.

By using information that is derived in calculation of the coordinating relation described above and is held and managed in an association access relation 75 of a connection interface 71, a user can associatively access mutually contents coupled and used in real cooperative work to reuse the contents. For this purpose, an interface 180 for document mutual access as shown in FIG. 18 is used. In the case that the user accesses an object of a contents type from an information processing apparatus such as a PC through a connection interface public server 2, this access interface 180 is called and is displayed on a screen of the information processing apparatus.

Contents of the object are displayed in a region 181 for displaying the contents and a list of relevant documents held in the association access relation 75 held by a connection interface of the object is displayed in a relevant object link list display region 182. Then, when the user clicks desired document display of the relevant object link list display region 182, an entity of the object is accessed based on a corresponding connection interface and a similar access interface 180 about the accessed contents is opened on the screen.

By continuing such an operation, the user can associatively access the associated contents by tracing a link using cooperative work as a trigger.

Here, in the example described above, description of linkage with a device 10 installed in work space is omitted for simplicity of description, but this can be linked to computational resources of a user P or a portable device 3 available in the work space and can be used by processing similar to that described above. For example, in the example described above, the point that a credential is unnecessary differs, but a shared work space server 11 has a function similar to that of the a connection interface public server 2, so that in the case of coordinating process, a coordination servers 9 may also acquire information about a connection interface from the corresponding shared work space server 11 and perform the coordinating process including this information. Incidentally, it may be constructed so that the shared work space server 11 is eliminated and information about the connection interface is previously registered in the public server 2 corresponding to each the device 10 installed in the work space and the coordination servers 9 acquires this information from the public server 2.

According to the example described above, in environment in which a user advances work while moving various work space inside an office according to purposes, work space based on flexible, open and decentralized control can be formed and as a result of this, the following effects can be obtained.

As long as connectivity on a network is ensured without being limited to particular work groups or members, various devices brought by the members, information contents or applications owned by the members can mutually be coupled between the members working in real work space to set up environment of cooperative work flexibly.

Also, since a hyperlink for reference can be set automatically between documents held by individual users, information sharing between the users can be advanced. For example, when there is similarity between my own document and a document owned by another member attending a certain meeting together in the contents, sharing of background information necessary for mutual communication can be advanced by tracing the hyperlink set between their documents.

Also, cooperative work such as cooperative editing or presentation control can be done with electronic documents held by individual users as a target. For example, in a situation in which a presentation is made, when a user publishes a slide, software in which another participant annotates the slide can be activated to edit my annotation.

Also, contents generated in work space can be shared between users. For example, a situation of meeting performed inside a meeting room is recorded automatically by a camera and a microphone and also the contents written on a whiteboard are captured as static image video and the recorded information can be preserved so that the information can be shared between the users.

Also, by dynamically coupling contents or applications held by a user to a function offered by fixed environment such as a meeting room, service adapted to the respective environments can be offered. For example, in a situation in which a presentation is made, by coupling an application of lighting control or opening and closing of a curtain installed in a meeting place, an operation for darkening lighting and closing the curtain at the time of starting the presentation can be associated and performed.

As described above, according to the invention, flexibility, openness and further decentralization can be implemented and the optimum work space to do cooperative work can be formed using various calculation resources.

What is claimed is:

1. A work space formation apparatus capable of coupling and using plural computational resources in a work space by connecting the computational resources available in the work space, the apparatus comprising:
   public means for holding and managing connection interfaces of the computational resources;
   detection means for detecting presence of the computational resources available in the work space;
   acquisition means for acquiring the connection interfaces of the detected available calculation resources from the public means;
   linkage relation derivation means for setting a linkage relation between the plural computational resources based on the acquired connection interfaces, wherein the corresponding calculation resources are coupled based on the set linkage relation; and
   association access means for accessibly holding a history of the linkage relation obtained by the linkage relation derivation means.

2. The work space formation apparatus according to claim 1, wherein the public means holds a condition as to whether or not each connection interface can be published and offers the connection interface, which can be published, to the acquisition means.

3. The work space formation apparatus according to claim 1, wherein:
   the computational resource is owned by a user or a portable device moving in and out the work space;
   the detection means detects presence of the computational resources available in the work space based on the fact that the user or the portable device is present in the work space, and issues a credential for identifying the detected user or portable device to the public means and the acquisition means;
   the acquisition means requests a connection interface with the credential; and
   the public means offers the requested connection interface to the acquisition means on condition of authentication based on the credential.

4. The work space formation apparatus according to claim 1, wherein:
   the public means, the detection means, the acquisition means and the linkage relation derivation means are provided in each of plural work spaces;
   the acquisition means of the work space in which linkage processing is performed acquires a connection interface acquired by the acquisition means of another work space; and
   the coordinating relation derivation means links the corresponding computational resources based on the connection interface acquired from another work space in addition to a connection interface acquired from the work space by the acquisition means.

5. The work space formation apparatus according to claim 1, wherein
   when a change in computational resources available in work space is detected by the detection means, the acquisition means performs acquisition processing according to the change and the linkage relation derivation means performs processing for coupling the corresponding computational resources based on a connection interface and updates a linkage relation.

6. The work space formation apparatus according to claim 1, wherein:
   computational resources of coordinating objects comprises contents documents;
   information indicating features of the contents of the corresponding contents documents is attached to a connection interface held by the public means; and
   the linkage relation derivation means mutually links the contents documents with strong relevance based on the feature information of the contents documents.

7. The work space formation apparatus according to claim 1, wherein:
   computational resources of coordinating objects are a contents document and an application component;
   applicable operation information about the contents document and offerable operation information about the application component are attached to a connection interface held by the public means; and
   the linkage relation derivation means links the application component to the contents document in which an applicable operation matches with an offerable operation.

8. The work space formation apparatus according to claim 1, further comprising:
   cooperative work space interface public means for publishing a connection interface of a computational resource owned by a device installed in work space; wherein
   the acquisition means acquires a connection interface from the cooperative work space interface public means and offers the connection interface to processing by the linkage relation derivation means.

9. A work space formation method capable of coupling and using plural computational resources available in a work space in which each computational resource is owned by a corresponding user who is movable in and out of the work space or is included in a corresponding portable device, the method comprising:
   detecting presence of each computational resource available in the work space based on whether or not the corresponding user or the corresponding portable device is in the work space;
   issuing a credential for identifying each detected user or each detected portable device;
   requesting connection interfaces of the detected computational resources with the respective credentials in response to the computational resources being detected;
   offering each requested connection interface on condition of authentication based on the corresponding credential;
   acquiring the connection interfaces of the computational resources;
   setting a linkage relation between the plural computational resources based on the acquired connection interfaces; and
   accessibly holding a history of the linkage relation.

10. A work space formation method capable of coupling and using plural contents documents available in a work space in which each computational resource is included in a corresponding portable device, the method comprising:

detecting presence of each contents document available in the work space based on whether or not the corresponding portable device is in the work space;

issuing a credential for identifying each detected portable device;

requesting connection interfaces of the detected contents documents with the respective credentials in response to the contents documents being detected;

offering each requested connection interface on condition of authentication based on the corresponding credential;

linking the offered connection interfaces of the contents documents;

setting a linkage relation between at least two of the contents documents based on the relevancy among the contents documents; and accessibly holding a history of the linkage relation.

11. A work space formation method capable of coupling and using a contents document and an application component available in a work space in which each computational resource is included in a corresponding portable device, the method comprising:

detecting presence of each contents document and each application component available in the work space based on whether or not the corresponding portable device is in the work space;

issuing a credential for identifying each detected portable device;

requesting connection interfaces of the detected contents documents and the detected application component with the respective credentials in response to the contents documents and the application component being detected;

offering each requested connection interface on condition of authentication based on the corresponding credential;

linking the offered connection interfaces of the contents document and the application component;

setting a linkage relation between the contents document and the application component on condition that the application component is applicable to the contents document; and accessibly holding a history of the linkage relation.

12. A connection interface public apparatus constructing a work space formation system capable of coupling and using plural computational resources in a work space by connecting the computational resources available in the work space in which each computational resource is owned by a corresponding user who is movable in movable in and out of the work space or is included in a corresponding portable device, the apparatus comprising:

a holding means that holds and manages connection interfaces of the computational resources;

an offering means that offers the corresponding connection interfaces by (1) confirming that the computational resources are available in the work space, (2) issuing a credential for identifying each detected user or each detected portable device, (3) requesting connection interfaces of the detected computational resources with the respective credentials in response to the computational resources being detected, and (4) setting a linkage relation based on the connection interfaces between the plural computational resources; and a history holding means that accessibly holds a history of the linkage relation.

13. A coordination apparatus constructing a work space formation system capable of coupling and using plural computational resources in a work space by connecting the computational resources available in the work space in which each computational resource is owned by a corresponding user who is movable in movable in and out of the work space or is included in a corresponding portable device, the apparatus comprising:

an acquiring means that acquires connection interfaces of the plural computational resources detected in response to detection of presence of each computational resource available in the work space based on whether or not the corresponding user or the corresponding portable device is in the work space;

an issuing means that issues a credential for identifying each detected user or each detected portable device;

a requesting means that requests connection interfaces of the detected computational resources with the respective credentials in response to the computational resources being detected;

an offering means that offers each requested connection interface on condition of authentication based on the corresponding credential;

a setting means that sets a linkage relation between the plural computational resources based on the acquired connection interfaces; and a history holding means that accessibly holds a history of the linkage relations.

14. A computer-readable storage medium storing a program executable by a computer constructing a work space formation system capable of coupling and using plural computational resources in a work space by connecting the computational resources available in the work space in which each computational resource is owned by a corresponding user who is movable in movable in and out of the work space or is included in a corresponding portable device, the program causing the computer to execute a method comprising:

holding and managing connection interfaces of the computational resources;

offering the corresponding connection interfaces by (1) confirming that the computational resources are available in the work space, (2) issuing a credential for identifying each detected user or each detected portable device, (3) requesting connection interfaces of the detected computational resources with the respective credentials in response to the computational resources being detected, and (4) setting a linkage relation based on the connection interfaces between the plural computational resources; and accessibly holding a history of the linkage relation.

15. A computer-readable storage medium storing program executable by a computer constructing a work space formation system capable of coupling and using plural computational resources in a work space by connecting the computational resources available in the work space in which each computational resource is owned by a corresponding user who is movable in movable in and out of the work space or is included in a corresponding portable device, the program causing the computer to execute a method comprising:

acquiring connection interfaces of the plural computational resources detected in response to detection of presence of each computational resource available in the work space based on whether or not the corresponding user or the corresponding portable device is in the work space;

issuing a credential for identifying each detected user or each detected portable device;

requesting connection interfaces of the detected computational resources with the respective credentials in response to the computational resources being detected;

offering each requested connection interface on condition of authentication based on the corresponding credential;

setting a linkage relation between the plural computational resources based on the acquired connection interfaces; and accessibly holding a history of the linkage relation.

* * * * *